(12) United States Patent
Sakamoto et al.

(10) Patent No.: US 7,230,943 B2
(45) Date of Patent: Jun. 12, 2007

(54) WIRELESS INFORMATION PROCESSING SYSTEM WITH WIRELESS INFORMATION RECORDING MEDIUM AND WIRELESS INFORMATION PROCESSING APPARATUS, AND COMMUNICATION METHOD THEREFOR

(75) Inventors: Hiroyuki Sakamoto, Kawasaki (JP); Akiko Noguchi, Yokohama (JP); Naoyoshi Watanabe, Yokohama (JP); Hideaki Korekoda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 740 days.

(21) Appl. No.: 10/618,694

(22) Filed: Jul. 15, 2003

(65) Prior Publication Data
US 2004/0063435 A1 Apr. 1, 2004

(30) Foreign Application Priority Data
Jul. 17, 2002 (JP) .......................... P2002-208124

(51) Int. Cl.
*H04J 3/00* (2006.01)

(52) U.S. Cl. .................. 370/345; 370/346; 370/449; 370/462; 370/458; 370/461; 370/329; 370/338

(58) Field of Classification Search ............... 370/345, 370/346, 449, 462, 458, 461, 329, 338
See application file for complete search history.

(56) References Cited

U.S. PATENT DOCUMENTS 3,755,781 A * 8/1973 Haas et al. ................ 340/10.2
4,940,974 A * 7/1990 Sojka ........................ 340/10.2
5,103,445 A * 4/1992 Ostlund ..................... 370/329
5,973,609 A * 10/1999 Schoch ...................... 370/449

FOREIGN PATENT DOCUMENTS

| JP | 10-222622 | 8/1998 |
| JP | 2000-148934 | 5/2000 |
| JP | 2000-298712 | 10/2000 |
| JP | 2001-126037 | 5/2001 |
| JP | 2001-516487 | 9/2001 |
| JP | 2003-168091 | 6/2003 |

* cited by examiner

*Primary Examiner*—Lester G. Kincaid
*Assistant Examiner*—Shantell Portis
(74) *Attorney, Agent, or Firm*—Oblon, Spivak, McClelland, Maier & Neustadt, P.C.

(57) ABSTRACT

A wireless information processing system has a wireless information processing apparatus and a wireless information recording medium. The apparatus has a first signal generator generating a first signal requesting the recording medium to set a command slot, a second signal generator generating a second signal requesting the recording medium to transmit a identification information, a third signal generator generating a third signal requesting the recording medium to set a time slot, and a receiver receiving a response signal from the recording medium. The recording medium has a receiver receiving the first to third signals, a command slot setup unit setting the command slot, an accumulation unit accumulating a number of receiving times of the second signal, a transmitter transmitting the response signal at a response time interval defined by the time slot, and a time slot setup unit setting the time slot.

24 Claims, 20 Drawing Sheets

FIG. 20

WIRELESS INFORMATION PROCESSING SYSTEM WITH WIRELESS INFORMATION RECORDING MEDIUM AND WIRELESS INFORMATION PROCESSING APPARATUS, AND COMMUNICATION METHOD THEREFOR

CROSS REFERENCE TO RELATED APPLICATIONS

This application is based upon and claims the benefit of priority from the prior Japanese Patent Application No. P2002-208124 filed on Jul. 17, 2002; the entire contents of which are incorporated herein by reference.

BACKGROUND OF THE INVENTION

1. Field of the Invention

The present invention relates to a wireless information processing system, a wireless information recording medium, a wireless information processing apparatus and a communication method for the wireless information processing system. The present invention relates in particular to a wireless information processing system which exchanges signals between a plurality of wireless information recording media and a wireless information processing apparatus through wireless communication and to a communication method for the wireless information processing system.

2. Description of Related Art

Conventionally, a wireless card system which includes a wireless information processing apparatus and a plurality of wireless information recording media such as wireless cards has been available. The wireless information processing apparatus has a card reader/writer and the like which exchanges signals with these wireless cards through wireless communications. In this wireless card system, a communication method called a multi-read method is established, in which the card reader/writer receives response signals from the plurality of wireless cards simultaneously. Recently, the various improvement and relation technology on the multi-read method has been proposed, for example, at Japanese patent Laid Open (Kokai) No. H10-222622.

The multi-read method (first related art) is characterized by providing each wireless card with a time difference for the transmission of the response signals in order to accurately receive the plurality of response signals simultaneously. In other words, the number of time intervals, which corresponds to the number of the cards, is set for a response time period required to receive the response signals from the plurality of wireless cards simultaneously, and each wireless card respectively sends the response signals with respect to the response time intervals allocated by the wireless cards. Owing to this, it is possible to avoid collisions between response signals and accurately receive the response signals. Thus, it is possible to reduce the communication time.

A specific explanation will now be given for a case where a wireless information processing apparatus transmits a start signal which requests a response for card addresses from a plurality of wireless cards located in a communicable area (communication area). Together with the start signal, the wireless information processing apparatus transmits, for example, the number of response time intervals, composed of the maximum number of wireless cards that can be located in the communication area simultaneously. Upon receipt of the start signal, each of the wireless cards generates a random number to select one of the response time intervals and transmits a response signal including the card address and the like to a card reader/writer at the selected response time interval. As a result, the probability that the wireless cards will transmit response signals at different response time intervals is increased, and response signal collisions will be avoided.

The communication method according to the first related art has the following advantages and disadvantages depending on the number of wireless cards. Once the wireless information processing apparatus has transmitted a start signal, the apparatus needs to wait for responses from a plurality of wireless cards for a certain response period thereafter. When the maximum number of wireless cards that can be present in a communication area at once is small, the number of response time intervals is reduced. Accordingly, a response time as a whole can be reduced. Therefore, for start signals sent simultaneously, the wireless information processing apparatus can efficiently and accurately receive response signals from multiple wireless cards.

However, when there are a large number of wireless cards with which to communicate, the wireless information processing apparatus must set many time intervals, and after a start signal has been transmitted, must wait for responses from the wireless cards for a long response time. When smaller time intervals are set in order to reduce the response time, the probability of problems such as collisions between response signals, and the accurate reception of response signals occurring, is increased.

As described above, there is an upper limit on the number of the wireless cards for which the communication method according to the first related art can function effectively. Depending on an increase/decrease in the number of the wireless cards, it is difficult to appropriately perform the wireless communications. A multi-read method has been required, in which the advantages of the communication method according to the first related art are maintained while the disadvantages thereof are overcome.

SUMMARY OF THE INVENTION

A first aspect of the present invention provides a wireless information processing system having a wireless information processing apparatus and a wireless information recording medium. The wireless information processing apparatus has a first start signal generator configured to generate a first start signal capable to request the wireless information recording medium having unique identification information to set a command slot, a second start signal generator configured to generate a second start signal capable to request the wireless information recording medium to transmit the identification information, a third start signal generator configured to generate a third start signal capable to request the wireless information recording medium to set a time slot, a transmitter capable to transmit the first to third start signals to the plurality of wireless information recording media located in a communication area, and a receiver capable to receive a response signal including the identification information transmitted by the wireless information recording medium. The wireless information recording medium has an identification information recorder in which the identification information is recorded, a receiver configured to receive the first to third start signals, a command slot setup unit configured to set the command slot, an accumulation unit configured to accumulate a number of times that the second start signal has been received, a transmitter configured to transmit the response signal at a response time interval defined by the time slot when the number of times that the second start signal is received matches a value of the command slot or when a value of the time slot is set, and a time slot setup unit capable to set the time slot when the response signal has not been appropriately received by the wireless information processing apparatus.

A second aspect of the present invention provides a wireless information processing system having a wireless information processing apparatus and a wireless information recording medium. The wireless information processing apparatus has a first start signal generator configured to generate a first start signal capable to request a wireless information recording medium having unique identification information to set a command slot, a second start signal generator configured to generate a second start signal capable to request the wireless information recording medium to transmit the identification information, a third start signal generator configured to generate a third start signal capable to request the wireless information recording medium to set a time slot, a transmitter capable to transmit the first to third start signals to the plurality of wireless information recording media located in a communication area, and a receiver capable to receive a response signal including the identification information transmitted by the wireless information recording medium. The wireless information recording medium has an identification information recorder in which the identification information is recorded, a receiver configured to receive the first to third start signals, a command slot setup unit configured to set the command slot, an accumulation unit configured to accumulate a number of times that the second start signal has been received, a time slot setup unit configured to set the time slot, and a transmitter capable to transmit the response signal to the wireless information processing apparatus at a response time interval defined by the time slot when the number of times that the second start signal is received matches a value of the command slot.

A third aspect of the present invention provides a wireless information recording medium having an identification information recorder in which unique identification information is recorded, a receiver capable to receive a first start signal requesting a setup of a command slot, a second start signal requesting a transmission of the identification information, and a third start signal requesting a setup of a time slot, the first to third signals being transmitted by a wireless information processing apparatus, a command slot setup unit configured to set the command slot, an accumulation unit configured to accumulate a number of times that the second start signal has been received, a transmitter capable to transmit a response signal including the identification information to the wireless information processing apparatus at a response time interval defined by the time slot when the number of times that the second start signal is received matches a value of the command slot or when the time slot is set, and a time slot setup unit capable to set the time slot when the response signal has not been appropriately received by the wireless information processing apparatus.

A fourth aspect of the present invention provides a wireless information recording medium having an identification information recorder in which unique identification information is recorded, a receiver capable to receive a first start signal requesting a setup of a command slot, a second start signal requesting a transmission of the identification information, and a third start signal requesting a setup of a time slot, the first to third signals being transmitted by a wireless information processing apparatus, a command slot setup unit configured to set the command slot, an accumulation unit configured to accumulate a number of times that the second start signal has been received, a time slot setup unit configured to set the time slot, and a transmitter capable to transmit a response signal including the identification information to the wireless information processing apparatus at a response time interval defined by the time slot when the number of times that the second start signal is received matches a value of the command slot.

A fifth aspect of the present invention provides a wireless information processing apparatus having a first start signal generator configured to generate a first start signal capable to request a wireless information recording medium having unique identification information to set a command slot, a second start signal generator configured to generate a second start signal capable to request the wireless information recording medium to transmit the identification information, a third start signal generator configured to generate a third start signal capable to request the wireless information recording medium to set a time slot, a transmitter capable to transmit the first to third start signals to the plurality of wireless information recording media located in a communication area, and a receiver capable to receive a response signal including the identification information transmitted by the wireless information recording medium, in which a number of times that the second start signal has been received matches a value of the command slot, and capable to receive the response signal transmitted by the wireless information recording medium at a response time interval defined by the time slot.

A sixth aspect of the present invention provides a communication method for a wireless information processing system having: a wireless information processing apparatus instructing a plurality of wireless information recording media present in a communication area to set command slots of which values are any one of integers from 0 to N (N is 0 or an arbitrary natural number); the wireless information recording medium, in which the value of the command slot matches a number of times that a response instruction has been received from the wireless information processing apparatus, transmitting unique identification information included in the wireless information recording media; the wireless information processing apparatus instructing the plurality of wireless information recording media to set time slots of which values are any one of integers from 0 to M (M is 0 or an arbitrary natural number); and the wireless information recording medium, of which the identification information transmitted has not been appropriately received by the wireless information processing apparatus, transmitting the identification information at a response time interval defined by the time slot.

A seventh aspect of the present invention provides a communication method for a wireless information processing system having: a wireless information processing apparatus transmitting a first start signal requesting a setup of command slots to a plurality of wireless information recording media present in a communication area; the wireless information recording medium, which has received the first start signal, setting the command slot; the wireless information processing apparatus transmitting a second start signal requesting the wireless information recording medium to transmit unique identification information included in the wireless information recording medium; the wireless information recording medium, in which a number of times that the second start signal has been received matches a value of the command slot, transmitting a response signal including the identification information; the wireless information processing apparatus transmitting a third start signal requesting a setup of a time slot; the wireless information recording medium, for which the response signal has not been appropriately received by the wireless information processing apparatus, setting the time slot; and the wireless information recording medium transmitting the response signal at a response time interval defined by the time slot.

A eighth aspect of the present invention provides a communication method for a wireless information processing system having: a wireless information processing apparatus instructing a plurality of wireless information recording media present in a communication area to set command slots to any one of integers from 0 to N (N is 0 or an arbitrary natural number), and set time slots to any one of integers from 0 to M (M is 0 or an arbitrary natural number); the wireless information recording medium, in which a value of the command slot matches a number of times that a response instruction transmitted by the wireless information processing apparatus has been received, transmitting unique identification information included in the wireless information recording medium at a response time interval defined by the time slots.

BRIEF DESCRIPTION OF THE DRAWINGS

FIG. 20 is a diagram showing an example in which the communication method of the wireless information processing system according to the second embodiment, which is shown in FIG. 19, is used;

DETAILED DESCRIPTION OF EMBODIMENTS

Figure 1:
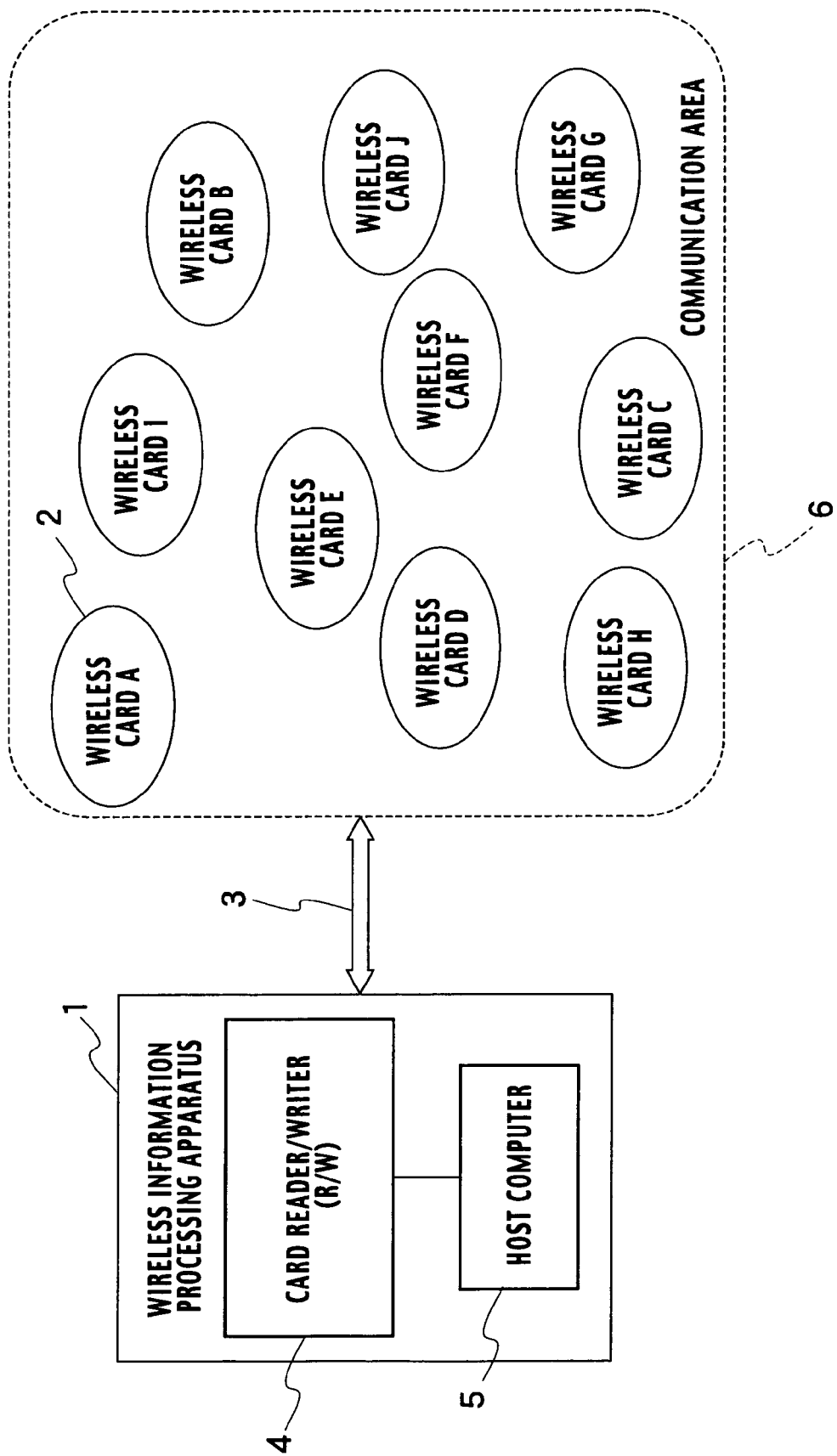
FIG. 1 is a block diagram showing the overall configuration of a wireless information processing system according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(First Embodiment)

<Wireless Information Processing System>

As shown in FIG. 1, a wireless information processing system according to a first embodiment of the present invention includes a plurality of wireless information recording media and a wireless information processing apparatus 1 for exchanging signals with the wireless information recording media via wireless communication 3. Hereinafter, an example of a "wireless card 2" serving as the wireless information recording medium is explained. For example, "plurality of wireless cards" indicates ten wireless cards A to J located in a communicable area 6 (hereinafter, referred to as "communication area") of the wireless information processing apparatus 1. The wireless cards A to J can exchange signals with the wireless information processing apparatus 1 through their own communication means which are independent from each other. The wireless information processing apparatus 1 includes a host computer 5 which generates/controls various start signals including different instructions for the wireless cards A to J, and a card reader/writer (R/W) 4 which transmits start signals and receives response signals from the wireless cards A to J in response to the start signals. Since the same structure is employed and the same operations are used for all the wireless cards A to J, these cards are generically called "wireless cards 2" in the following explanation.

Figure 2:
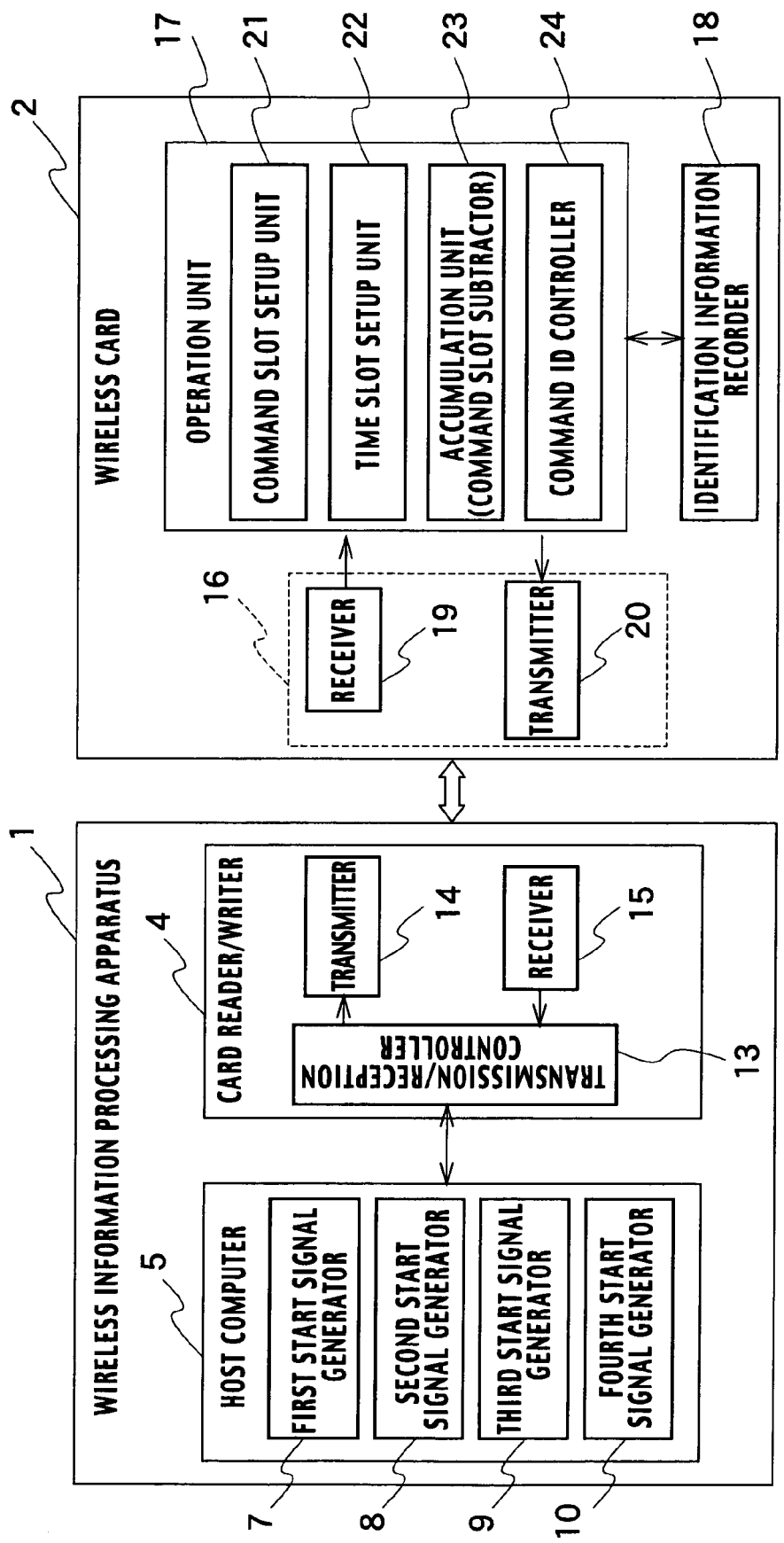
FIG. 2 is a block diagram showing the detailed configuration of the wireless information processing system in FIG. 1.

As shown in FIG. 2, the wireless card 2 includes a receiver 19 which receives various start signals transmitted from the wireless information processing apparatus 1, a transmitter 20 which transmits a response signal to the wireless information processing apparatus 1, an identification information recorder 18 which records unique card identification information, and an operation unit 17 which controls the exchange of the start signal and the response signal. The unique card identification information recorded in the identification information recorder 18 differs in each wireless card 2.

The operation unit 17 includes a command slot setup unit 21 which sets a command slot, a time slot setup unit 22 which sets a time slot, an accumulation unit 23 which counts the number of times a specific start signal is received, and a specific information controller (hereinafter referred to as "command ID controller") 24 which stores and controls specific information (hereinafter referred to as "command IDs") that are valid when the command ID controller 24 is in communication with the wireless information processing apparatus 1.

Herein, the "command slot" includes one of integers 0 to N (N is 0 or an arbitrary natural number), and the "time slot" includes one of integers 0 to M (M is 0 or an arbitrary natural number). The "various start signals" transmitted by the wireless information processing apparatus 1 include a first start signal for requesting the setup of the command slot, a second start signal for requesting an identification information response, a third start signal for requesting the setup of the time slot, and a fourth start signal for requesting a command ID change. The command slot setup unit 21 sets the command slot in accordance with the first start signal, and the time slot setup unit 22 sets the time slot in accordance with the third start signal. The command slot is set in a range from 0 to N, while the time slot is set in a range from 0 to M. The accumulation unit 23 calculates the number of times that the second start signal is received as a "specific start signal" and determines whether the number of the times that the second start signal is received coincides with the command slot.

When the number of times for the reception of the second start signal matches that for the command slot, or at a response time interval defined by the time slot, the transmitter 20 transmits a response signal that includes identification information to the wireless information processing apparatus 1. Note that, when the time slot setup unit 22 sets the time slot, the transmitter 20 transmits a response signal at the response time interval defined by the time slot.

Hereinafter, a further explanation will be given for a command slot subtractor 23 as an example of an accumulation unit. The command slot subtractor 23 decrements a value by one for the command slot each time a second start signal is received and determines whether the value of the command slot has reached 0.

In the wireless information processing apparatus 1, the card reader/writer 4 includes a transmitter 14 which transmits first to fourth start signals to the wireless card 2, a receiver 15 which receives a response signal that includes the identification information from the wireless card 2, and a transmission/reception controller 13 which controls the transmission/reception of the first to fourth start signals and the response signal.

The host computer 5 includes a first start signal generator 7 which generates a first start signal, a second start signal generator 8 which generates a second start signal, a third start signal generator 9 which generates a third start signal, and a fourth start signal generator 10 which generates a fourth start signal.

<Wireless Information Processing Apparatus>

Figure 3:
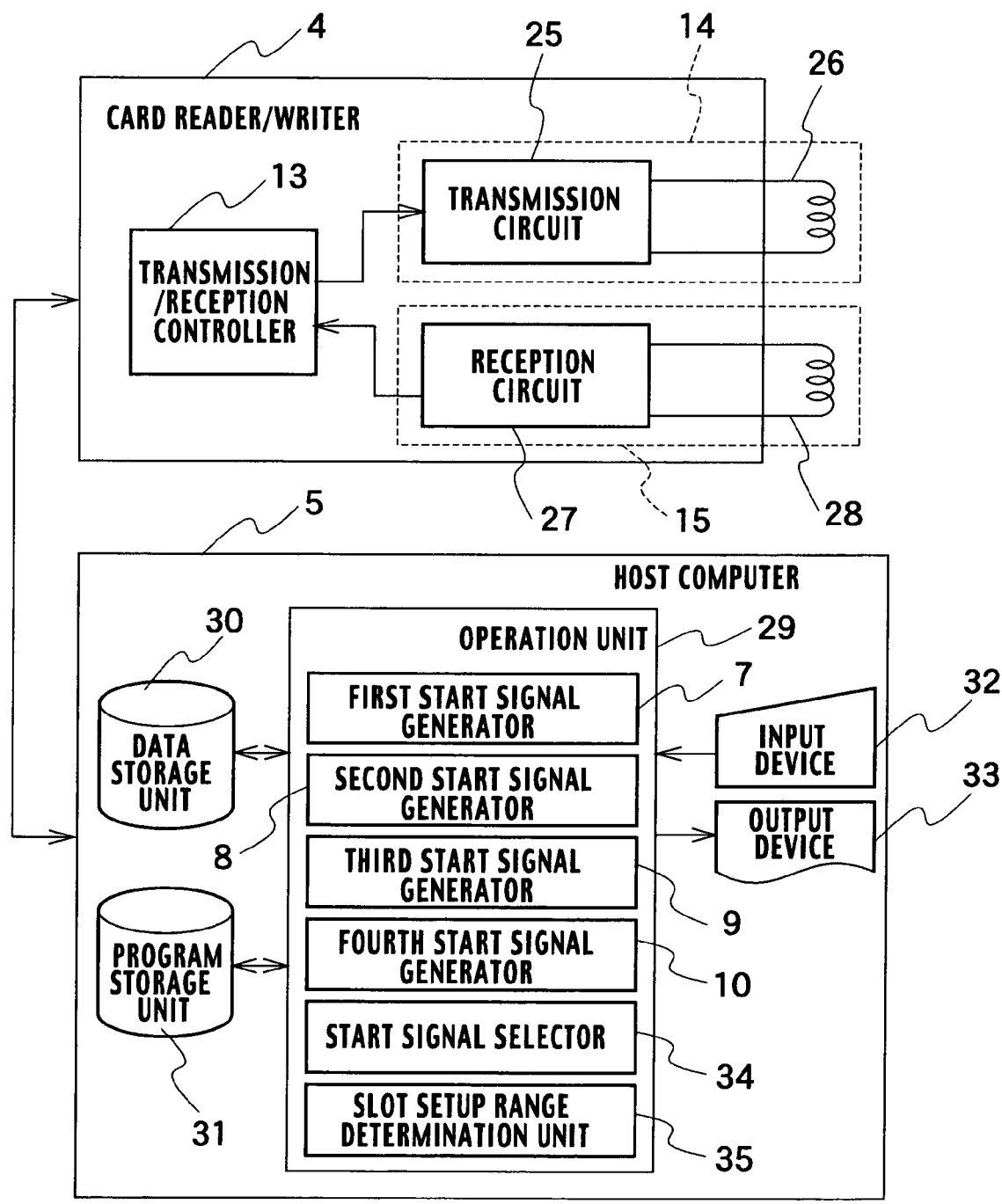
FIG. 3 is a block diagram showing the detailed configuration of the wireless information processing apparatus in FIG. 2.

As is shown in FIG. 3, the transmitter 14 includes a transmission circuit 25 controlled by the transmission/reception controller 13, and a loop shaped transmission antenna coil 26 connected to the transmission circuit 25. The receiver 15 includes a reception circuit 27 controlled by the transmission/reception controller 13, and a loop shaped antenna coil 28 connected to the reception circuit 27.

The host computer 5 includes an operation unit 29 which generates and controls the first to fourth start signals, a data storage unit 30, a program storage unit 31, an input device 32, and an output device 33. The input device 32 is a keyboard, a mouse, a light pen, a flexible disk device or the like. The data storage unit 30 and the program storage unit 31 are magnetic tapes, magnetic drums, magnetic disks, optical disks, magneto-optical disks, semiconductor memories such as ROMs and RAMs, or the like. The output device 33 is a display device or a printer. The operation unit 29, the data storage unit 30 and the program storage unit 31 can be constituted by a normal computer system that includes a CPU and storage devices such as a ROM, a RAM, a magnetic disk and the like connected to the CPU. The input data for the individual processes performed by the operation unit 29 are stored in the data storage unit 30, and program instructions are stored in the program storage unit 31. These input data and the program instructions are read by the CPU as needed, and the processing is executed. Moreover, data such as numerical value information generated by the reception of the response signal from the wireless card 2 in FIG. 2 is stored in the data storage unit 30.

The operation unit 29 includes first to fourth start signal generators 7 to 10, a start signal selector 34 which selects one of the first to fourth start signals to be transmitted, and a slot setup range determination unit 35 which determines the setup ranges for the command slot and the time slot. The slot setup range determination unit 35 sets N, which represents the setup range for the command slot, and M, which represents the setup range for the time slot. Reference symbols N and M can be determined by referring to the maximum number of the wireless cards 2 that can be present in the communication area 6 at the same time.

<Start Signal>

Figure 4:
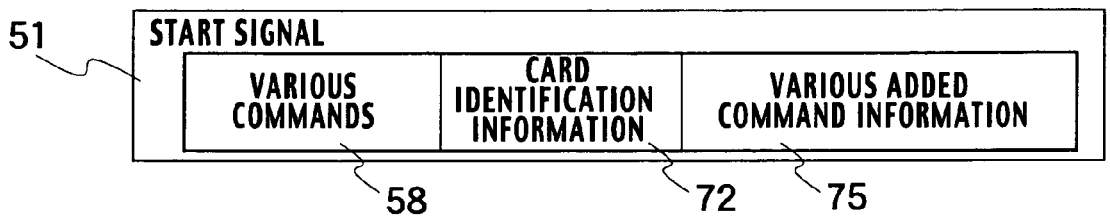
FIG. 4 is a block diagram showing a general structure of a start signal generated and transmitted by the wireless information processing apparatus.

As shown in FIG. 4, a start signal 51 generated and transmitted by the wireless information processing apparatus 1 includes various commands 58 indicating specific instructions to the wireless card 2, card identification information 72 for identifying a plurality of wireless cards 2 located in the communication area 6 in FIG. 1, and various added command information 75. Upon the reception of the start signal 51, the wireless cards 2 executes instructions indicated by various commands 58 by referring to the added command information 75 and under a condition where the card identification information 72 is matched.

Figure 5A:
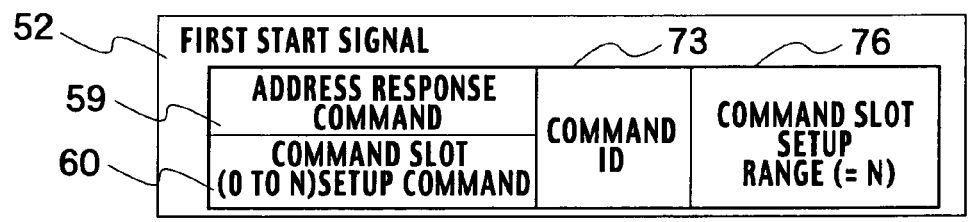
FIGS. 5A to 5D are block diagrams showing the specific structures of first to fourth start signals.

As shown in FIG. 5A, a first start signal 52 includes: an address response command 59 and a command slot (0 to N) setup command 60, which serve as the various commands 58 in FIG. 4; a command ID 73 serving as the card identification information 72 in FIG. 4; and information regarding a command slot setup range (=N) 76 serving as the various added command information 75 in FIG. 4.

Figure 5B:

As shown in FIG. 5B, a second start signal 53 includes: an address response command 61 and a command slot subtraction command 62, which serve as the various commands 58 in FIG. 4; and a command ID 73 serving as the card identification information 72 in FIG. 4.

Figure 5C:
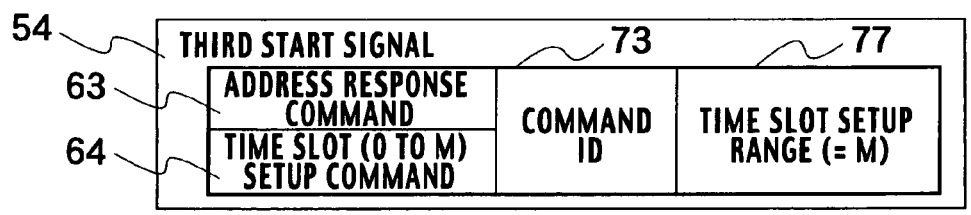

As shown in FIG. 5C, a third start signal 54 includes: an address response command 63 and a time slot (0 to M) setup command 64, which serve as the various commands 58 in FIG. 4; a command ID 73 serving as the card identification information 72 in FIG. 4; and information on a time slot setup range (=M) 77 serving as the various added command information 75 in FIG. 4.

Figure 5D:
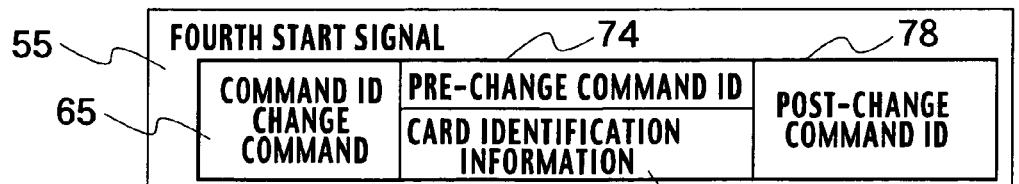

As shown in FIG. 5D, a fourth start signal 55 includes: a command ID change command 65 serving as the various commands 58 in FIG. 4; a pre-change command ID 74 and a card address 46, which serve as the card identification information 72 in FIG. 4; and a post-change command ID 78 serving as the various added command information 75 in FIG. 4. The "card address" is an example of identification information recorded in the identification information recorder 18 in FIG. 2, and a detailed explanation thereof will be given later with reference to FIG. 6.

<Wireless Card>

Figure 6:
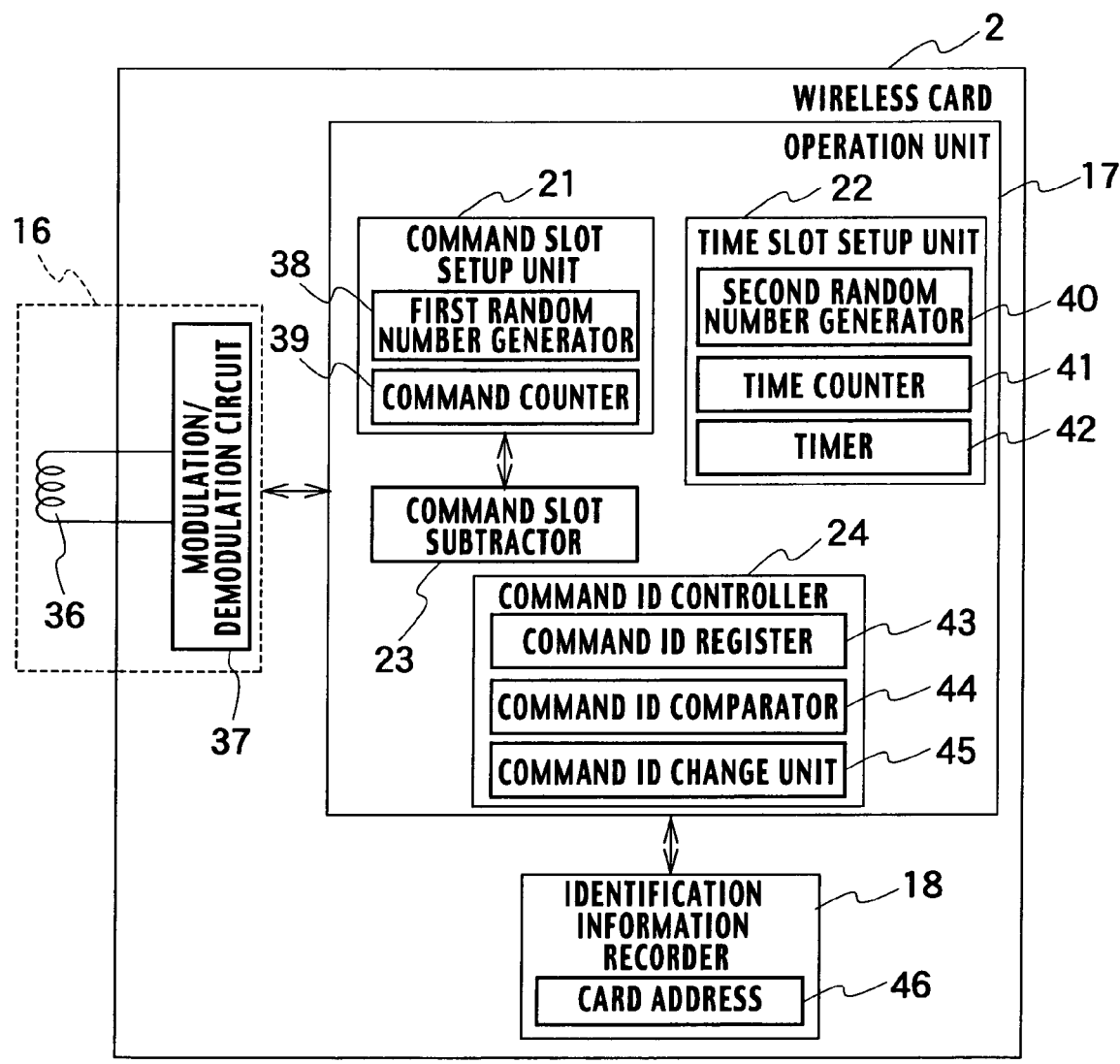
FIG. 6 is a block diagram showing the detailed configuration of a wireless card in FIG. 2.

The receiver 19 and the transmitter 20 of the wireless card 2 in FIG. 2 correspond to a transmitter/receiver 16 in FIG. 6. As shown in FIG. 6, the transmitter/receiver 16 includes a modulation/demodulation circuit 37 connected to the operation unit 17, and a loop shaped transmission/reception antenna coil 36 connected to the modulation/demodulation circuit 37.

The command slot setup unit 21 includes a first random number generator 38 which generates a random number, and a command counter 39 which sets a command slot by employing the random number generated by the first random number generator 38. The command slot subtractor 23 decrements the command slot set by the command counter 39 by one each time the second start signal 53 in FIG. 5B is received.

The time slot setup unit 22 includes a second random number generator 40 which generates a random number, a time counter 41 which sets a time slot by using the random number generated by the second random number generator 40, and a timer 42 which measures a response time interval defined by the time slot. To measure the response time interval defined by the time slot, for example, the timer 42 decrements the time slot by one at a predetermined time interval and determines whether the command slot has reached 0.

The card address 46 is recorded in the identification information recording unit 18 as an example of identification information unique to each wireless card 2.

The command ID controller 24 further includes a specific information recorder (hereinafter referred to as "command ID register") 43 which temporarily records a command ID, a specific information comparator (hereinafter referred to as "command ID comparator") 44 which compares the command ID recorded in the command ID register 43 with the command ID 73 included in the first to third start signals 52 to 54 in FIGS. 5A to 5C or with the pre-change command ID 74 included in the fourth start signal 55 in FIG. 5D, and a specific information change unit (hereinafter referred to as "command ID change unit") 45 which changes the command ID recorded in the command ID register 43 to the post-change command ID 78. The command ID change unit 45 changes the command ID when the command ID recorded in the command ID register 43 matches the pre-change command ID 74, and the card address 46 recorded in the identification information recorder 18 matches the card address 46 included in the fourth start signal 55.

When the command ID recorded in the command ID register 43 matches the command IDs 73 included in the first to third start signals 52 and 54, the command slot setup unit 21, the command slot subtractor 23 and the time slot setup unit 22 execute the commands 59 to 64 in accordance with the first to third start signals 52 and 54.

Figure 7:
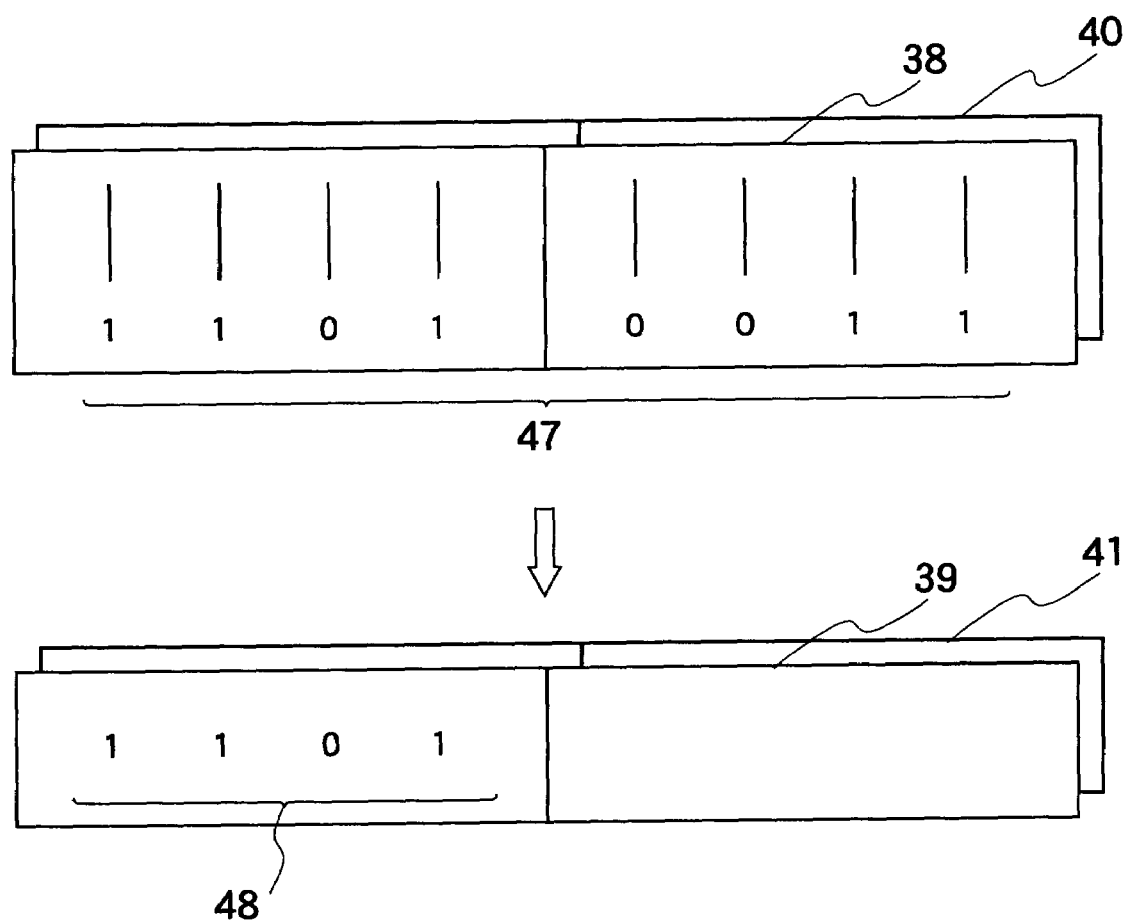
FIG. 7 is a block diagram showing a relationship between a first random number generator and a command counter in FIG. 6, and a relationship between a second random number generator and a time counter in FIG. 6.

As shown in FIG. 7, the first random number generator 38 in FIG. 6 generates a random number 47 constituted of, for example, eight bits of data. In accordance with the command slot setup range (=N) 76 in FIG. 5A, the command counter 39 in FIG. 6 extracts data constituted of a required number of bits, e.g., four bits, from the random number 47 and sets a slot (command slot) 48. For example, when N=15, the command counter 39 can extract the four bit data from the random number 47 to set a command slot. In the command slot, an arbitrary integer of 0 to 15 ($=2^4-1$) is randomly set.

Similarly, the second random number generator 40 in FIG. 6 generates a random number 47 constituted of, for example, eight bits of data. In accordance with the time slot setup range (=M) 77 in FIG. 5C, the time counter 41 in FIG. 6 extracts data constituted of a required number of bits, for example, four, from the random number 47 and sets a slot (time slot) 48. When four bits of data are employed to set the time slot, an arbitrary integer of 0 to 15 ($=2^4-1$) is set for the time slot.

Figure 8:
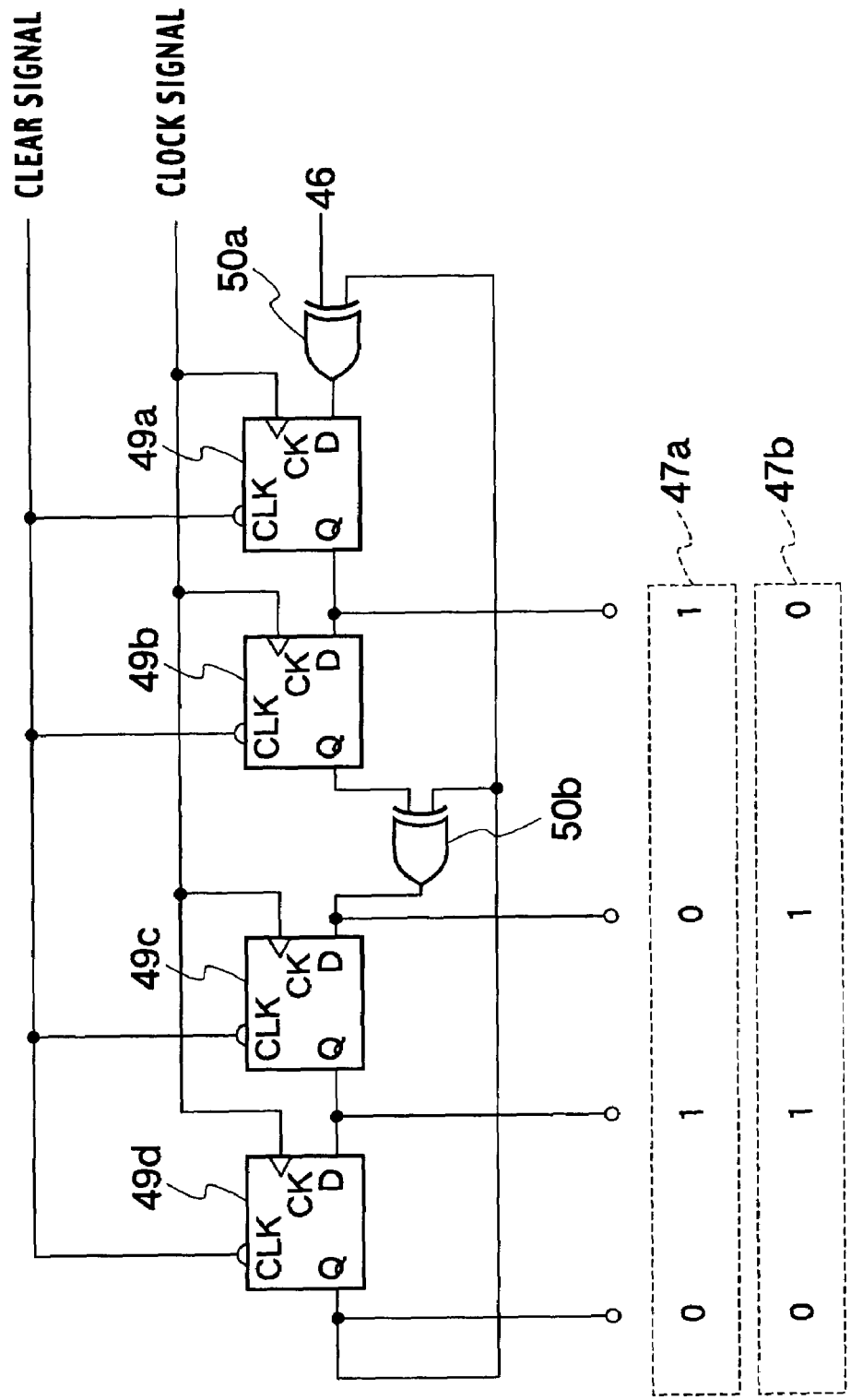
FIG. 8 is a block diagram showing an example of a specific circuit structure for the first and the second random number generators in FIG. 7.

As shown in FIG. 8, each of the first and the second random number generators 38 and 40 in FIG. 6 includes a plurality of serially connected registers 49a to 49d and exclusive OR (XOR) circuits 50a and 50b. FIG. 8 shows the circuit structure of the first and second random number generators 38 and 40 in FIG. 4 that generate random numbers 47a and 47b in FIG. 7 constituted of the four bit data. The four registers 49a to 49d are connected in series, and the XOR circuit 50b is inserted in series between the registers 49b and 49c. The input terminal of the register 49a is connected to the output terminal of the XOR circuit 50a, and information regarding the card address 46 is inputted to the input terminal of the XOR circuit 50a. The output terminal of the register 49d is fed back to the input terminals of the XOR circuits 50a and 50b. A common clock signal line and a common clear signal line are respectively connected to clock terminals CK and clear terminals CLR of the registers 49a to 49d. The outputs of the register 49a, the XOR circuit 50b, the register 49c and the register 49d form the random numbers 47a and 47b constituted of four bit data.

<Operation of Wireless Card>

Figure 9:
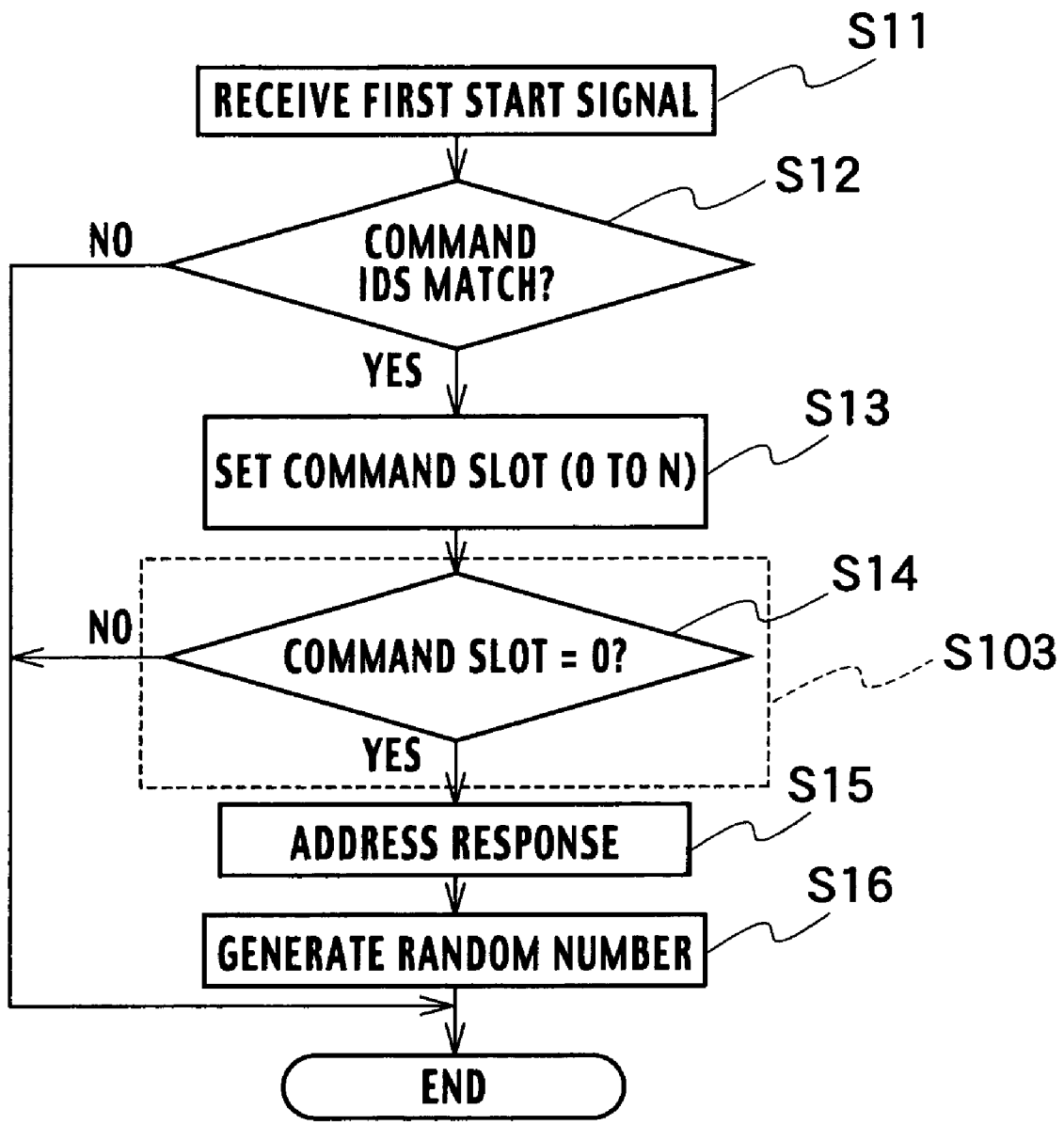
FIG. 9 is a flowchart showing the operation of the wireless card that has received the first start signal.

With reference to FIG. 9, an explanation will now be given for the operation of the wireless card 2 in FIG. 6 when receiving the first start signal 52 in FIG. 5A.

(a) At stage S11, the transmitter/receiver 16 in FIG. 6 receives the first start signal 52. At stage S12, the command ID comparator 44 in FIG. 6 determines whether the command ID recorded in the command ID register 43 matches the command ID 73 included in the first start signal 52. When the command IDs match (Yes at stage S12), the operation advances to stage S13.

(b) At stage S13, the command slot setup unit 21 in FIG. 6 sets the command slot (0 to N), i.e., the wireless card 2 executes the command slot (0 to N) setup command 60 in FIG. 5A. During this process, the command slot setup range (=N) 76 is referred.

(c) At stage S14, the command slot subtractor 23 in FIG. 6 determines whether the value for the command slot set by the command slot setup unit 21 is 0. When the value for the command slot is 0 (Yes at stage S14), the operation advances to stage S15.

(d) At stage S15, the transmitter/receiver 16 in FIG. 6 transmits the response signal including the card address 46 to the wireless information processing apparatus 1 in FIG. 2. In other words, the wireless card 2 executes the address response command 59 included in the first start signal 52. At stage S16, the first random number generator 38 generates the random number, and the operation of the wireless card 2 is terminated.

Note that, when the command IDs do not match (No at stage S12) and when the value for the command slot is not 0 (No at stage S14), the operation of the wireless card 2 that received the first start signal 52 is terminated.

Figure 10:
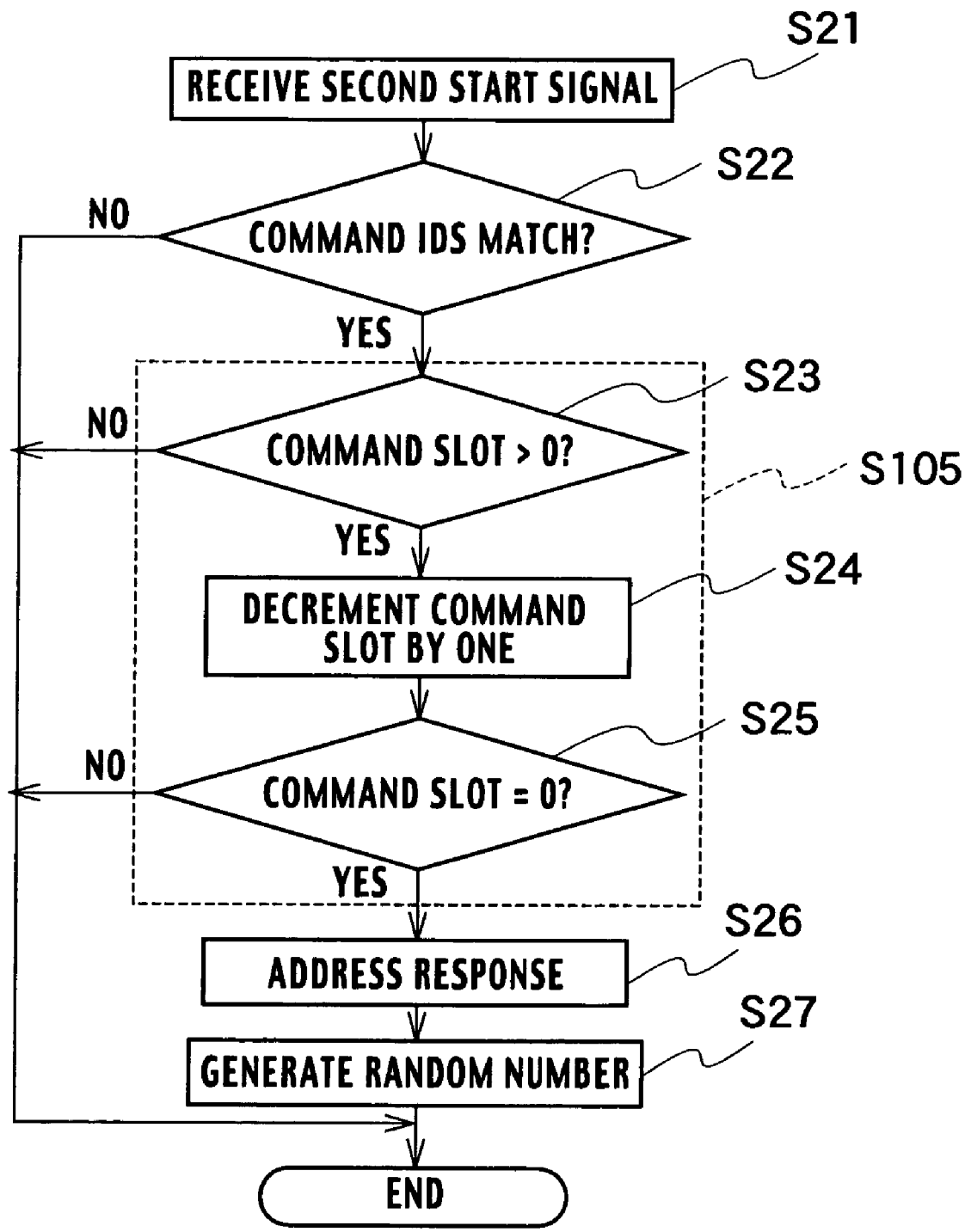
FIG. 10 is a flowchart showing the operation of the wireless card that has received the second start signal.

With reference to FIG. 10, an explanation will now be given for the operation of the wireless card 2 in FIG. 6 when receiving the second start signal 53 in FIG. 5B.

(A) At stage S21, the transmitter/receiver 16 in FIG. 6 receives the second start signal 53. At stage S22, the command ID comparator 44 in FIG. 6 determines whether the command ID recorded in the command ID register 43 matches the command ID 73 included in the second start signal 53. When the command IDs match (Yes at stage S22), the operation advances to stage S23.

(B) At stage S23, the command slot subtractor 23 in FIG. 6 determines whether the value for the command slot is greater than 0, i.e., whether the value of the command slot is 1 to N or 0. When the value for the command slot is greater than 0 (Yes at stage S23), the operation advances to stage S24. At stage S24, the command slot subtractor 23 decrements the value for the command slot by one, i.e., defines the value obtained by decrementing the current command slot value by one as a new command slot value.

(C) At stage S25, the command slot subtractor 23 determines whether the value for the command slot is 0. When the value for the command slot is 0 (Yes at stage S25), the operation advances to stage S26.

(D) At stage S26, the transmitter/receiver 16 in FIG. 6 transmits a response signal to the wireless information processing apparatus 1. In other words, the wireless card 2 executes the address response command 61 included in the second start signal 53. At stage S27, the first random number generator 38 generates the random number, and the operation of the wireless card 2 is terminated.

Note that, when the command IDs do not match (No at stage S22), when the value for the command slot is 0 (No at stage S23), or when the value for the command slot is not 0 (No at stage S25), the operation of the wireless card 2 that received the second start signal 53 is terminated.

As described above, the wireless card 2 decrements the value for the command slot upon each reception of the second start signal 53 and transmits the response signal when the value for the command slot has reached 0. However, the wireless card 2 does not decrement the value for the command slot when the value is already 0. The case "the value of the command slot is already 0" includes cases where the value for the command slot is set to 0 at stage S13 in FIG. 9 and the number of times that the second start signal 53 is received is greater than the value for the command slot (1 to N).

Figure 11:
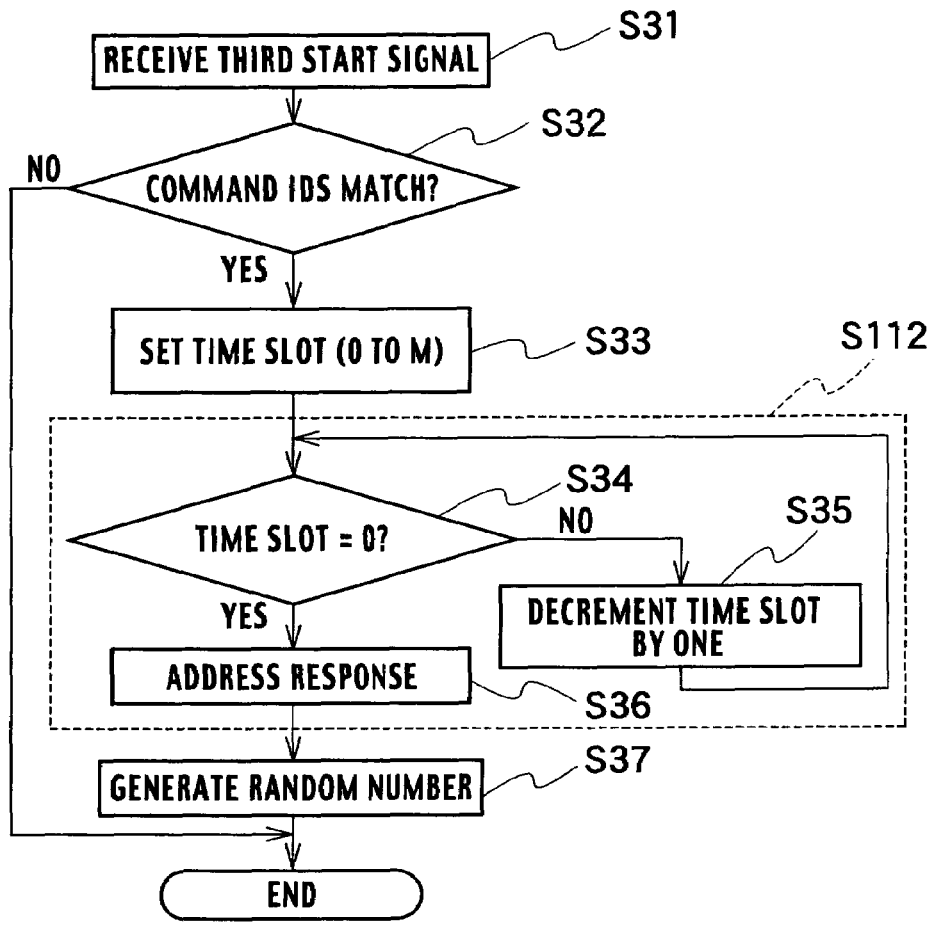
FIG. 11 is a flowchart showing the operation of the wireless card that has received the third start signal.

With reference to FIG. 11, an explanation will now be given for the operation of the wireless card 2 in FIG. 6 when receiving the third start signal 54 in FIG. 5C.

(a) At stage S31, the transmitter/receiver 16 in FIG. 6 receives the third start signal 54. At stage S32, the command ID comparator 44 in FIG. 6 determines whether the command ID recorded in the command ID register 43 matches the command ID 73 included in the third start signal 54. When the command IDs match (Yes at stage S32), the operation advances to stage S33.

(b) At stage S33, the time slot setup unit 22 in FIG. 6 sets the time slot (0 to M), i.e., the wireless card 2 executes the time slot (0 to M) setup command 64. During this process, the time slot setup range (=M) 77 is referred.

(c) At stage S34, the time slot setup unit 22 determines whether the value that has been set for the time slot is 0. When the value for the time slot is 0 (Yes at stage S34), the operation advances to stage S36. At stage S36, the transmitter/receiver 16 transmits the response signal to the wireless information processing apparatus 1 in FIG. 2, i.e., the wireless card 2 executes the address response command 63 included in the third start signal 54. Meanwhile, when the value for the time slot is not 0 (No at stage S34), the operation moves onto stage S35. At stage S35, the timer 42 decrements the value of the time slot by one. Thereafter, the operation returns to stage S34, and the timer 42 continues to decrement the value for the time slot by one until the value reaches 0.

(d) After the response signal has been transmitted (after stage S36), at stage S37 the second random number generator 40 generates a random number, and the operation of the wireless card 2 is terminated.

Note that, when the two command IDs do not match (No at stage S32), the operation of the wireless card 2 that received the third start signal 54 is terminated.

Figure 12:
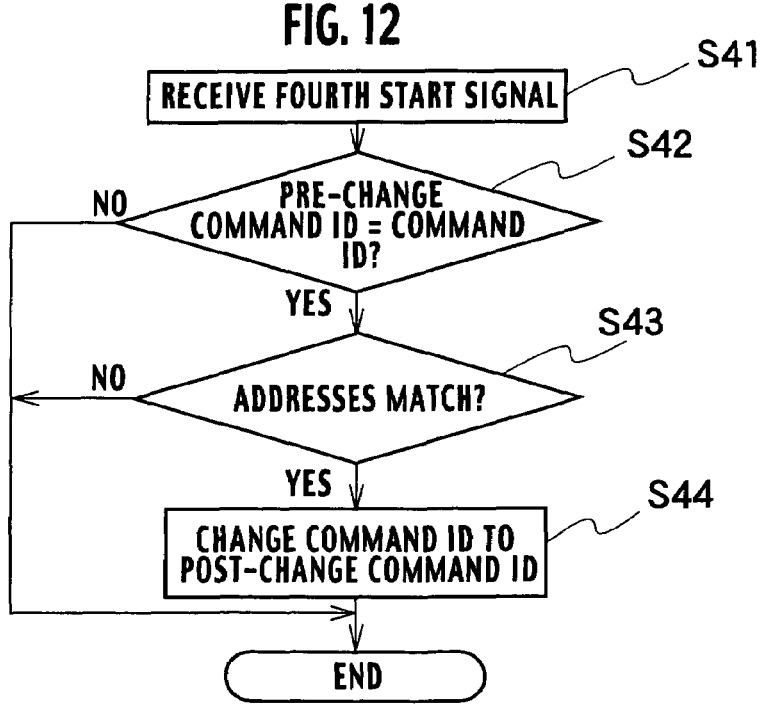
FIG. 12 is a flowchart showing the operation of the wireless card that has received the fourth start signal.

With reference to FIG. 12, an explanation will now be given for the wireless card 2 in FIG. 6 when receiving the fourth start signal 55 in FIG. 5D.

(A) At stage S41, the transmitter/receiver 16 in FIG. 6 receives the fourth start signal 55. At stage S42, the command ID comparator 44 in FIG. 6 determines whether the command ID recorded in the command ID register 43 in FIG. 6 matches the pre-change command ID 74 included in the fourth start signal 55. When the command ID and the pre-change command ID 74 match (Yes at stage S42), the operation advances to stage S43.

(B) At stage S43, the operation unit 17 determines whether the card address 46 recorded in the identification information recorder 18 matches the card address 46 included in the fourth start signal 55. When the two card addresses 46 match (Yes at stage S43), the operation advances to stage S44.

(C) At stage S44, the command ID change unit 45 changes the card address 46 recorded in the identification information recorder 18 to the post-change command ID 78, and the operation of the wireless card 2 is terminated.

Note that, when the command ID and the pre-change command ID 74 do not match (No at stage S42), and when the two card addresses 46 do not match (No at stage S43), the operation of the wireless card 2 that received the fourth start signal 55 is terminated.

<Communication Method for Wireless Information Processing System>

Figure 13:
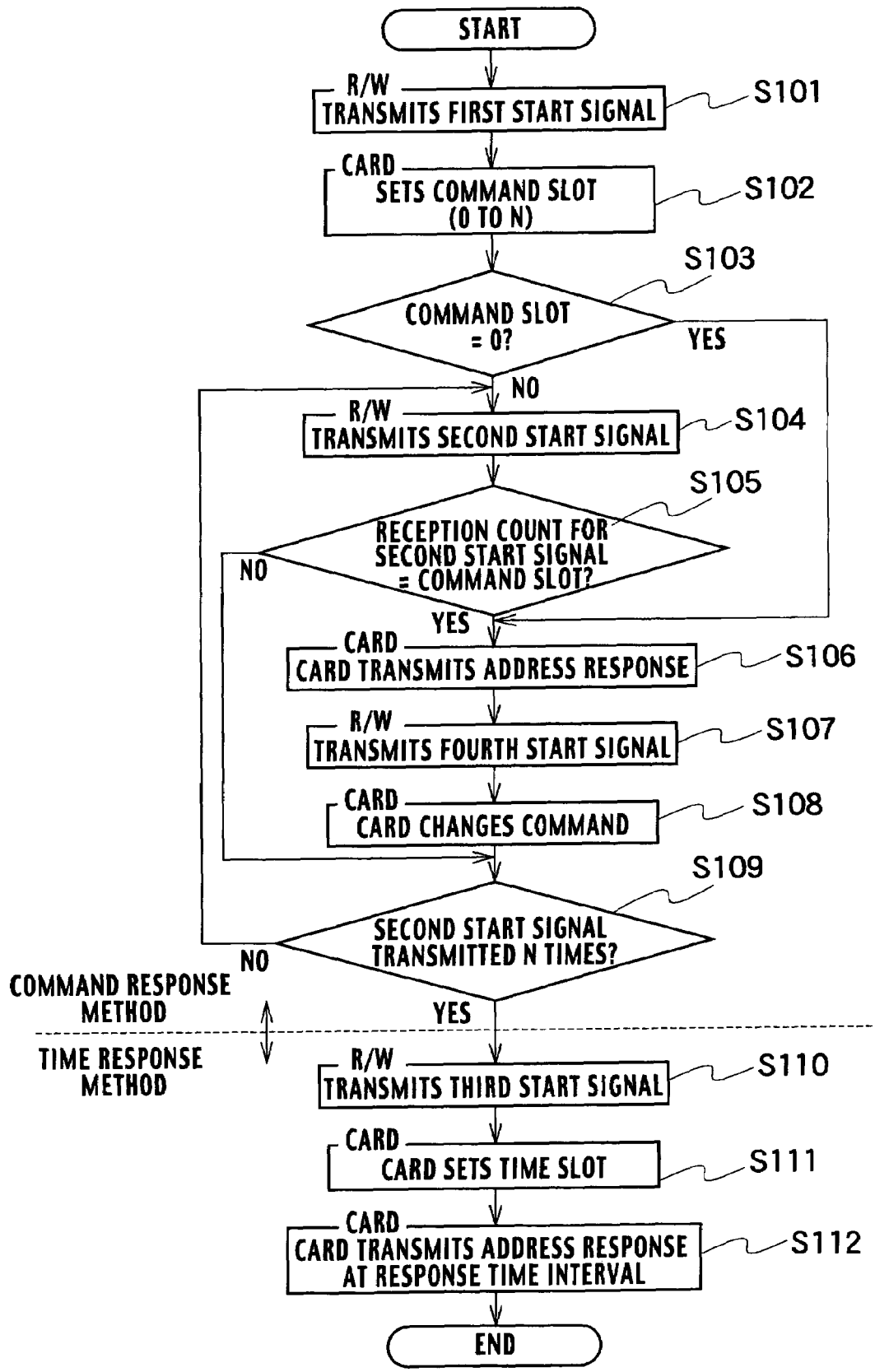
FIG. 13 is a flowchart showing a communication method of the wireless information processing system according to the first embodiment of the present invention.

A communication method for the wireless information processing system according to the first embodiment of the present invention will now be described with reference to FIG. 13. In FIG. 13, "R/W" denotes the card reader/writer 4 in FIG. 1, and "card" represents the wireless card 2 in FIG. 1. Further, the same initial values are provided for the command IDs of the plurality of wireless cards 2 located in the communication area 6, while the card addresses 46 in FIG. 6 differ.

(a) At stage S101, the card reader/writer 4 transmits the first start signal 52 to the plurality of wireless cards 2 in the communication area 6. The command ID 73 and information regarding the command slot setup range (=N) 76 are included in the first start signal 52.

(b) At stage S102, the transmitter/receiver 16 of each wireless card 2 receives the first start signal 52, and the command slot setup unit 21 sets the command slot. Since the same initial value of all the command IDs is provided for all the wireless cards 2, all of the wireless cards 2 execute the command slot setup command 60 included in the first start signal 52.

(c) At stage S103, the command slot subtractor 23 determines whether the value for the command slot set at stage S102 is 0. When it is ascertained that the value of the command slot is 0 (Yes at stage S103), the operation is shifted to stage S106. When it is ascertained that the command slot is not 0 (No at stage S103), the operation advances to stage S104. It should be noted that stage S103 corresponds to stage S14 in FIG. 9.

(d) At stage S104, the card reader/writer 4 transmits the second start signal 53.

(e) At stage S105, the command slot subtractor 23 determines whether the number of times that the second start signal 53 has been received matches the value for the command slot. It should be noted that stage S105 corresponds to stages S23 to S25 in FIG. 10. When it is ascertained that the number of times the second start signal 53 has been received matches the value for the command slot (Yes at stage S105), the operation advances to stage S106. When it is ascertained that the two do not match (No at stage S105), the operation is shifted to stage S109.

(f) At stage S106, the wireless card 2 transmits the response signal, which includes the card address 46. In other words, when it is "Yes" at stage S103, the wireless card 2 executes the address response command 59 included in the first start signal 52 in FIG. 5A, and when it is "Yes" at stage S105, it executes the address response command 61 included in the second start signal 53 in FIG. 5B. Therefore, when "the command slot value set upon the reception of the first start signal 52 is 0" is regarded as "the number of times that the second start signal 53 has been received is 0", it can be assumed that the address response command at stage S106 is to be executed when the number of times that the second start signal 53 has been received matches the value for the command slot.

(g) At stage S107, when the card reader/writer 4 has appropriately received the response signal from the wireless card 2, the fourth start signal generator 10 in FIG. 2 employs the card address 46 included in the response signal to generate the fourth start signal 55 in FIG. 5D and the card reader/writer 4 transmits the fourth start signal 55. Note that, in order for the card reader/writer 4 to appropriately receive the response signal, one wireless card 2 is required to send a response signal in response to one transmission of either the first start signal 52 or the second start signal 52. In other words, when two or more wireless cards 2 simultaneously transmit response signals in response to one transmission of either the first start signal 52 or the second start signal 53, those two, or more, response signals cannot be appropriately received by the card reader/writer 4.

(h) At stage S108, among the wireless cards 2 that have received the fourth start signal 55, only a wireless card 2 in which the command ID and the card address 46 match those included in the fourth start signal 55 changes the command ID to the post-change command ID 78. As a result, since the command ID of the wireless card 2 for which a response signal has been appropriately received by the card reader/writer 4 is changed, this wireless card 2 can be distinguished from others which have not appropriately received response signals.

(i) At stage S109, the host computer 5 determines whether the second start signal 53 has been transmitted for N times. When the second start signal 53 has not yet been transmitted for N times (No at stage S109), the operation returns to stage S104, and the loop at stages S104 to S109 is repeated for N times. When the second start signal 53 has been transmitted N times (Yes at stage S109), the operation advances to stage S110.

(j) At stage S110, the card reader/writer 4 transmits the third start signal 54 to the wireless cards 2.

(k) At stage S111, among the wireless cards 2 that have received the third start signal 54, a time slot is set by a wireless card 2 from which a response signal has not been appropriately received by the card reader/writer 4. In this case, because the command ID of the wireless card 2 from which a response signal was appropriately received by the card reader/writer 4 was changed at stage S108, the command ID of the wireless card 2 does not match the command ID included in the third start signal 54. Therefore, this wireless card 2 does not execute the time slot (0 to M) setup command 64 included in the third start signal 54.

(l) Finally, at stage S112, the wireless card 2 that has set the time slot transmits the response signal to the card reader/writer 4 at a response time interval defined by the time slot. It should be noted that stage S112 corresponds to stages S34 to S36 in FIG. 11. In other words, at predetermined time intervals, the timer 42 repeatedly decrements the value for the time slot by one until the value reaches 0 (stages S34 and S35), and the wireless card 2 transmits a response signal when the value for the time slot has reached 0 (S36).

Note that, the communication method that includes stages S101 to S109 is called a "command response method," and the communication method that includes stages S110 to S112 is called a "time response method." Further, the communication method that includes stages S101 to S112 is called a "shift communication method," and provides control for the shift from the command response method to the time response method. An invention related to the command response method is described in Japanese Patent Laid Open (Kokai) No. 2003-168091, the entire contents (all pages) of this reference being incorporated herein by reference.

Figure 14:
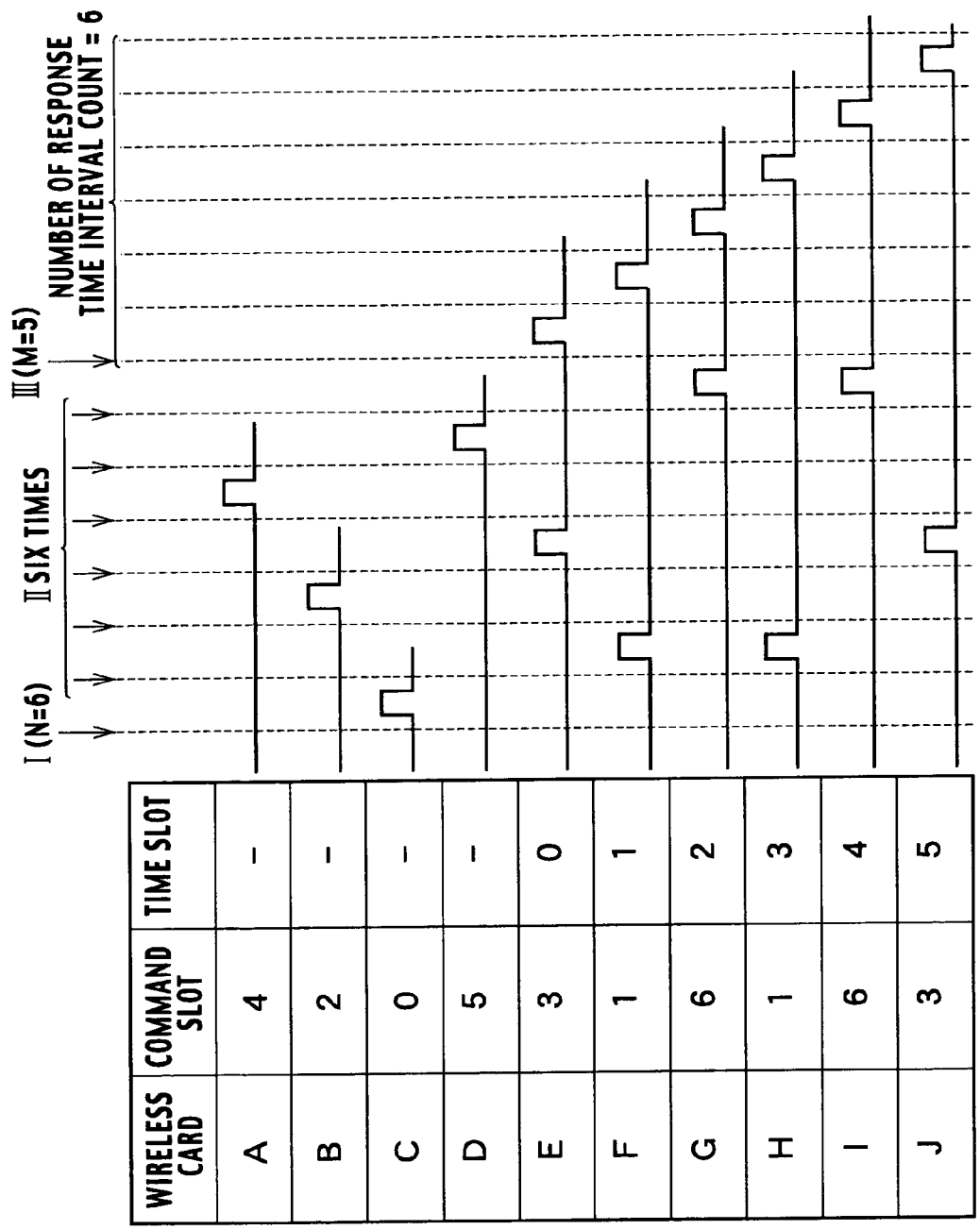
FIG. 14 is a diagram showing an example in which the communication method of the wireless information processing system according to the first embodiment, which is shown in FIG. 13, is used.

Next, with reference to FIG. 14, an explanation will be given for an example in which the communication method in FIG. 13 is employed for ten wireless cards 2. In FIG. 14, "A to J" denote the wireless cards A to J in FIG. 1, "arrows" represent the transmissions of the first to third start signals 52 to 54 by the card reader/writer 4, "I to III" represent the first to third start signals 52 to 54. In addition, the portions along the projected lines for the wireless cards A to J represent the transmission of the response signals. Furthermore, the command slot setup range 76 included in the first start signal 52 is N=6, and the time slot setup range 77 included in the third start signal 54 is M=5.

(A) First, the card reader/writer 4 transmits the first start signal 52. Upon the reception of this first start signal 52, the wireless cards A to J set each command slot in a range of 0 to 6 (=N), as shown in FIG. 14. Of the wireless cards A to J, since the command slot=0 has been set to only the wireless card C, only the wireless card C transmits a response signal. Accordingly, the card reader/writer 4 can appropriately receive the response signal from the wireless card C. Therefore, after the transmission of the response signal, the command ID of the wireless card C is changed.

(B) Second, the card reader/writer 4 transmits the second start signal 53 for the first time. Among the wireless cards A to J that received the second start signal 53, only the wireless cards F and H have the values for command slots, which are the same as the number of the times that the second start signal 53 is received (=1). Accordingly, the wireless cards F and H simultaneously transmit response signals. Thus, the card reader/writer 4 cannot appropriately receive the response signals from the wireless cards F and H. Therefore, the command IDs of the wireless cards F and H are not changed.

(C) Third, among the wireless cards A to J that received the second start signal 53 for the second time, only the wireless card B has a command slot set to have the same value as the number of times (=2) that the second start signal 53 has been received. Therefore, only the wireless card B transmits the response signal from the wireless card B. Thus, the command ID of the wireless card B is changed after the transmission of the response signal.

(D) Next, among the wireless cards 2 that receive the second start signal 53 for the third time, the wireless cards E and J have command slots set to have the same value as the number of times (=3) that the second start signal 53 has been received. Accordingly, since response signals are transmitted simultaneously by the wireless cards E and J, the card reader/writer 4 cannot appropriately receive these response signals from the wireless cards E and J. Thus, the command IDs of the wireless cards E and J are not changed.

(E) In the same manner, the second start signal 53 is transmitted by the card reader/writer 4 for the fourth, fifth and sixth time. Specifically, for the fourth transmission of the second start signal 53, a response signal is transmitted by only the wireless card A. For the fifth transmission of the second start signal 53, a response signal is transmitted by only the wireless card D. For the sixth transmission of the second start signal 53, response signals are transmitted by the wireless cards G and I. Therefore, the command IDs of the wireless cards A to D are changed while the command IDs of the wireless cards G and I are not changed.

(F) After the second start signal has been transmitted six times, the third start signal 54 is transmitted by the card reader/writer 4. Among the wireless cards A to J that receive the third start signal 54, the wireless cards E to J, from which response signals have not been appropriately received, set time slots in a range from 0 to 5 (=M), respectively. Since the command IDs have been changed for the wireless cards A to D, from which response signals were appropriately received, these wireless cards A to D do not execute the time slot (0 to 5) setup command 64 included in the third start signal 54.

(G) Among the wireless cards E to J, only the wireless card E has set a time slot=0. Accordingly, the wireless card E transmits a response signal without repeating the loop at stages S34 and S35 in FIG. 11 (S36). In other words, the wireless card E transmits a response signal at the first response time interval defined by the time slot (=0).

(H) The wireless cards F to J that set the time slots=1 to 5 repeat the loop at stages S34 to S35 in FIG. 11 for one to five times. Thereafter, the wireless cards F to J transmit response signals (S36).

As described above, a wireless card 2 which serves as a wireless information recording medium transmits a response signal at a response time interval defined by the time slot when the number of times that the second start signal 53 has been received matches the value of a command slot or when the value of the time slot is set. Specifically, a wireless card 2 returns a card address 46 serving as identification information when a response condition defined by a command slot has been established or when a response condition defined by a time slot has been established. When comparatively many wireless cards 2 are present in the communication area 6, first, the transmission/reception of response signals is performed in accordance with the command slots. Thereafter, when the number of wireless cards 2 has been satisfactorily reduced, the transmission/reception of response signals is performed in accordance with the time slots.

When comparatively many wireless cards 2 are present in the communication area 6, first, the command slots are set and the card reader/writer 4 transmits the second start signal 53 to the wireless cards 2 for the required number of times. Accordingly, the card reader/writer 4 can appropriately receive response signals from the plurality of wireless cards 2. In addition, the card reader/writer does not have to wait for a long time to receive the response signals from the plurality of wireless cards 2, and the response signals can be efficiently received within a short period of time. After employing the command response method, the number of the wireless cards 2 from which the response signals are not appropriately received is relatively small. Thereupon, the wireless cards 2, from which the response signals are not appropriately received in the command response method, transmit response signals at a predetermined time interval by setting the value of the time slot. As a result, the number of time intervals of the response time is reduced, and the overall response time period is made shorter. Therefore, for one transmission of the third start signal, the response signals from the plurality of wireless cards 2 can be efficiently and accurately received.

As shown in FIG. 13, the "command response method" is employed when there are a large number of wireless cards 2. Thereafter, the "time response method" is employed for a comparatively small number of wireless cards 2 from which the response signals have not been appropriately received. Further, by employing the "shift communication method," conflicts between the response signals can be avoided, and the communication time period can be reduced, regardless of how many objects must be communicated with.

(Second Embodiment)

<Wireless Information Processing Apparatus>

Figure 15:
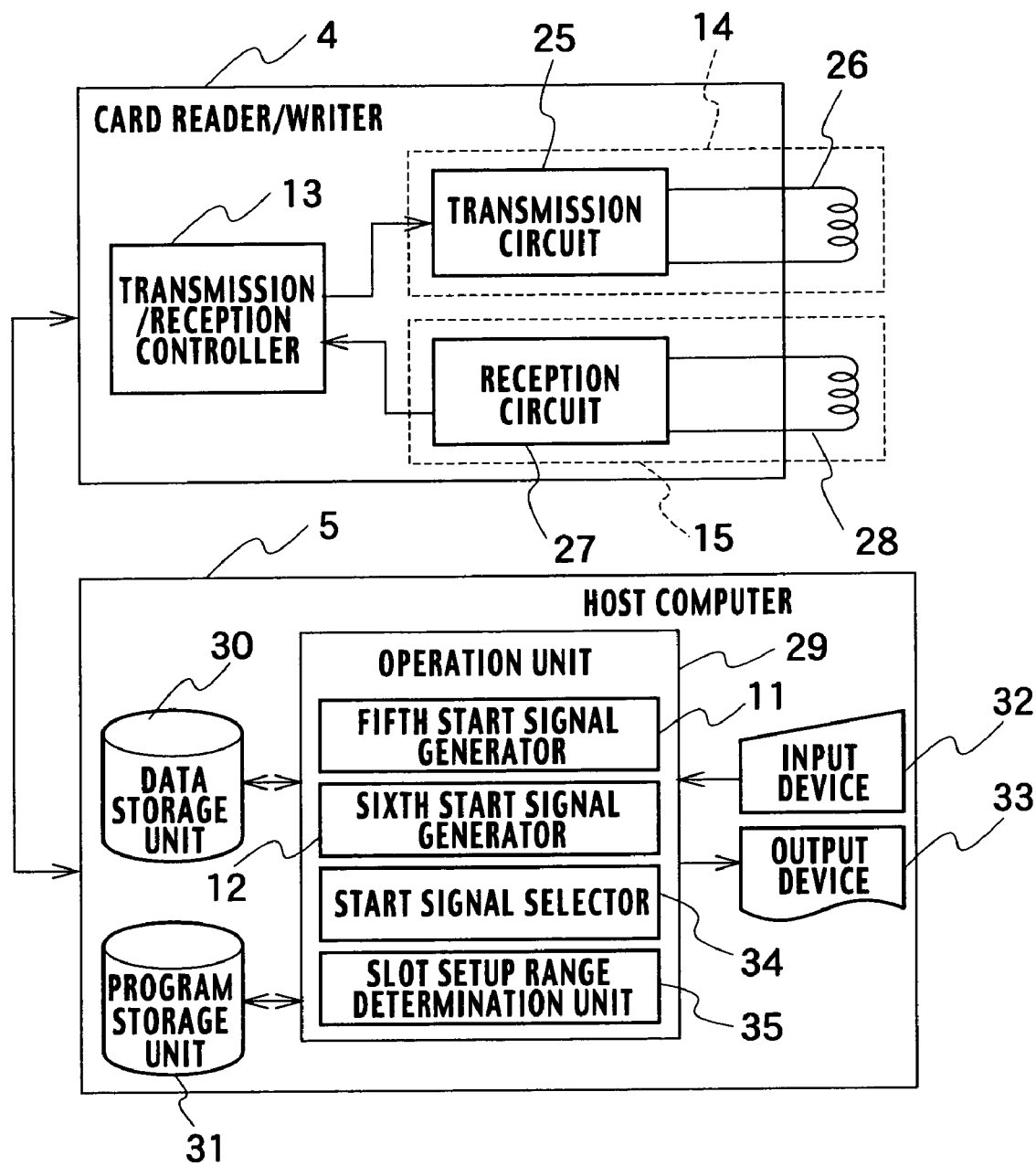
FIG. 15 is a block diagram showing the detailed configuration of a wireless information processing apparatus according to a second embodiment of the present invention.

As shown in FIG. 15, a wireless information processing apparatus according to a second embodiment of the present invention includes a card reader/writer 4 and a host computer 5. The card reader/writer 4 has a transmission/reception controller 13, a transmitter 14 and a receiver 15. The transmitter 14 includes a transmission circuit 25 controlled by the transmission/reception controller 13, and a transmission antenna coil 26 connected to the transmission circuit 25. The receiver 15 includes a reception circuit 27 controlled by the transmission/reception controller 13, and a reception antenna coil 28 connected to the reception circuit 27. The host computer 5 has an operation unit 29 which generates and controls the fifth and sixth start signals, a data storage unit 30, a program storage unit 31, an input device 32 and an output device 33. The card reader/writer 4 has the same configuration as that in FIG. 3. Except for the operation unit 29, the host computer 5 has the same configuration as that in FIG. 3.

The operation unit 29 includes a fifth start signal generator 11, a sixth start signal generator 12, a start signal selector 34 which selects the fifth or the sixth start signal to be transmitted, and a slot setup range determination unit 35. The fifth start signal generator 11 generates the fifth start signal to request the setup of a command slot and a time slot, and the sixth start signal generator 12 generates the sixth start signal to request the setup of a time slot.

<Start Signal>

Figure 16A:
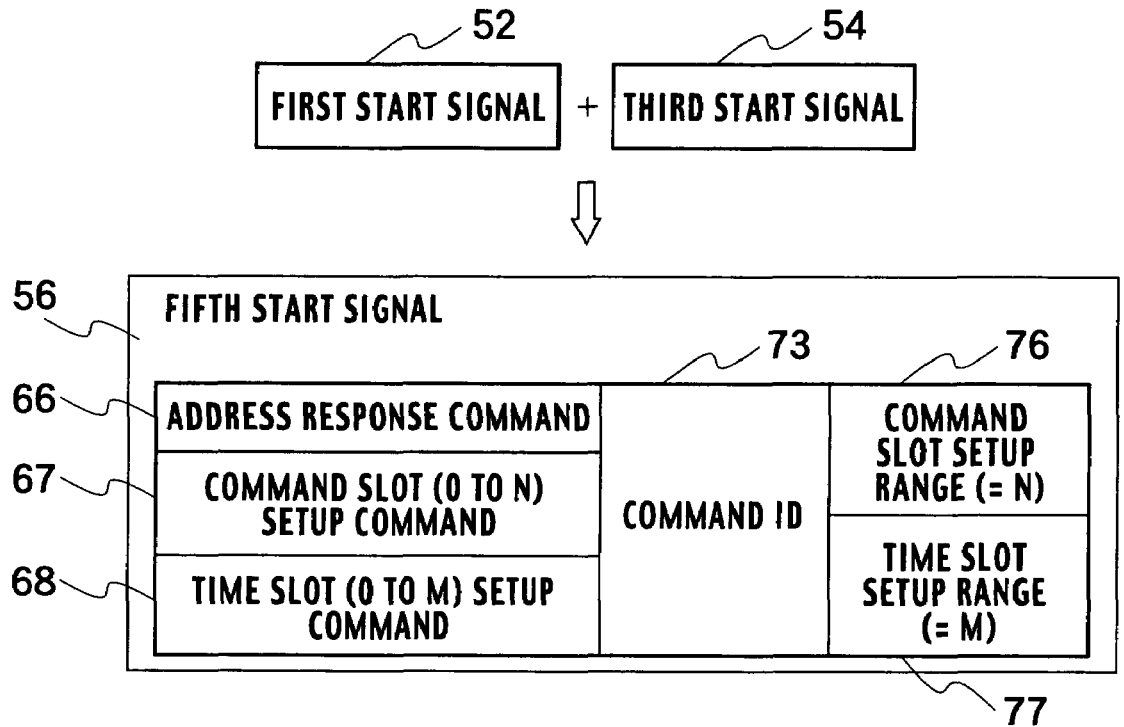
FIGS. 16A and 16B are block diagrams showing specific structures of fifth and sixth start signals.

As shown in FIG. 16A, a fifth start signal 56 includes an address response command 66, a command slot (0 to N) setup command 67 and a time slot (0 to M) setup command 68, which represent the various commands 58 in FIG. 4; a command ID 73, representing the card identification information 72 in FIG. 4; and information regarding a command slot setup range (=N) 76 and a time slot setup range (=M) 77, representing the various added command information 75 in FIG. 4. Therefore, the fifth start signal 56 can be regarded as a combination of the first start signal 52 in FIG. 5A and the third start signal 54 in FIG. 5C.

Figure 16B:
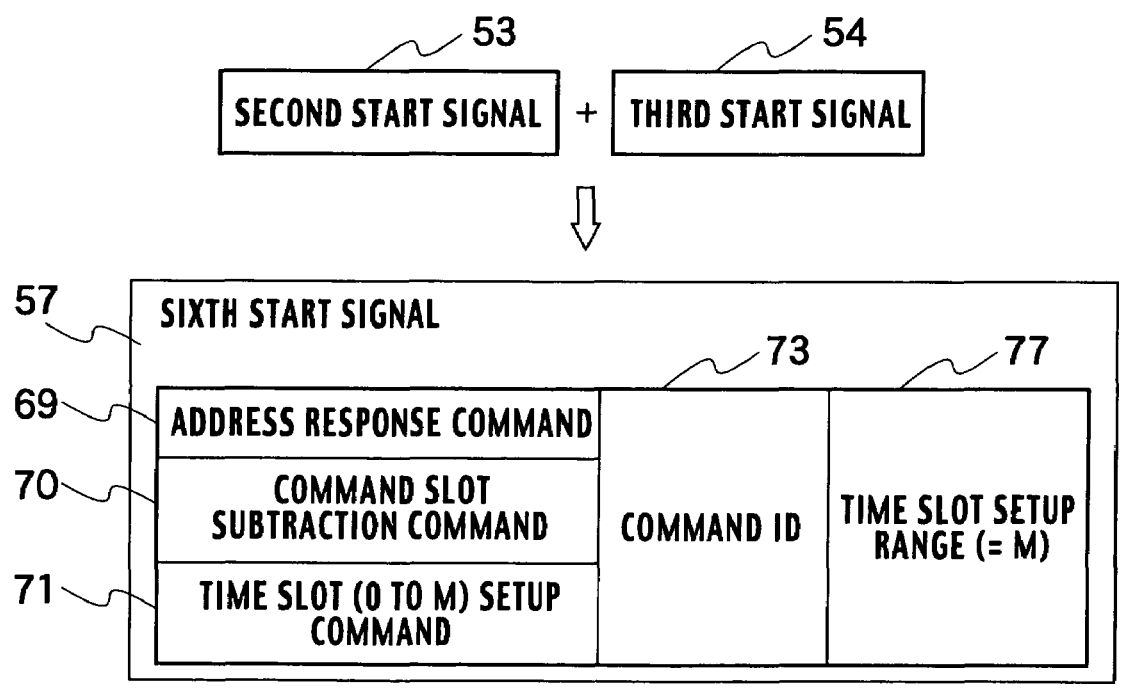

As shown in FIG. 16B, a sixth start signal 57 includes: an address response command 69, a command slot subtraction command 70 and a time slot (0 to M) setup command 71, which represent the various commands 58 in FIG. 4; a command ID 73, representing the card identification information 72 in FIG. 4; and information on a time slot setup range (=M) 77, representing the various added command information 75 in FIG. 4. Therefore, the sixth start signal 57 can be regarded as a combination of the second start signal 53 in FIG. 5B and the third start signal 54 in FIG. 5C.

<Operation of Wireless Card>

Figure 17:
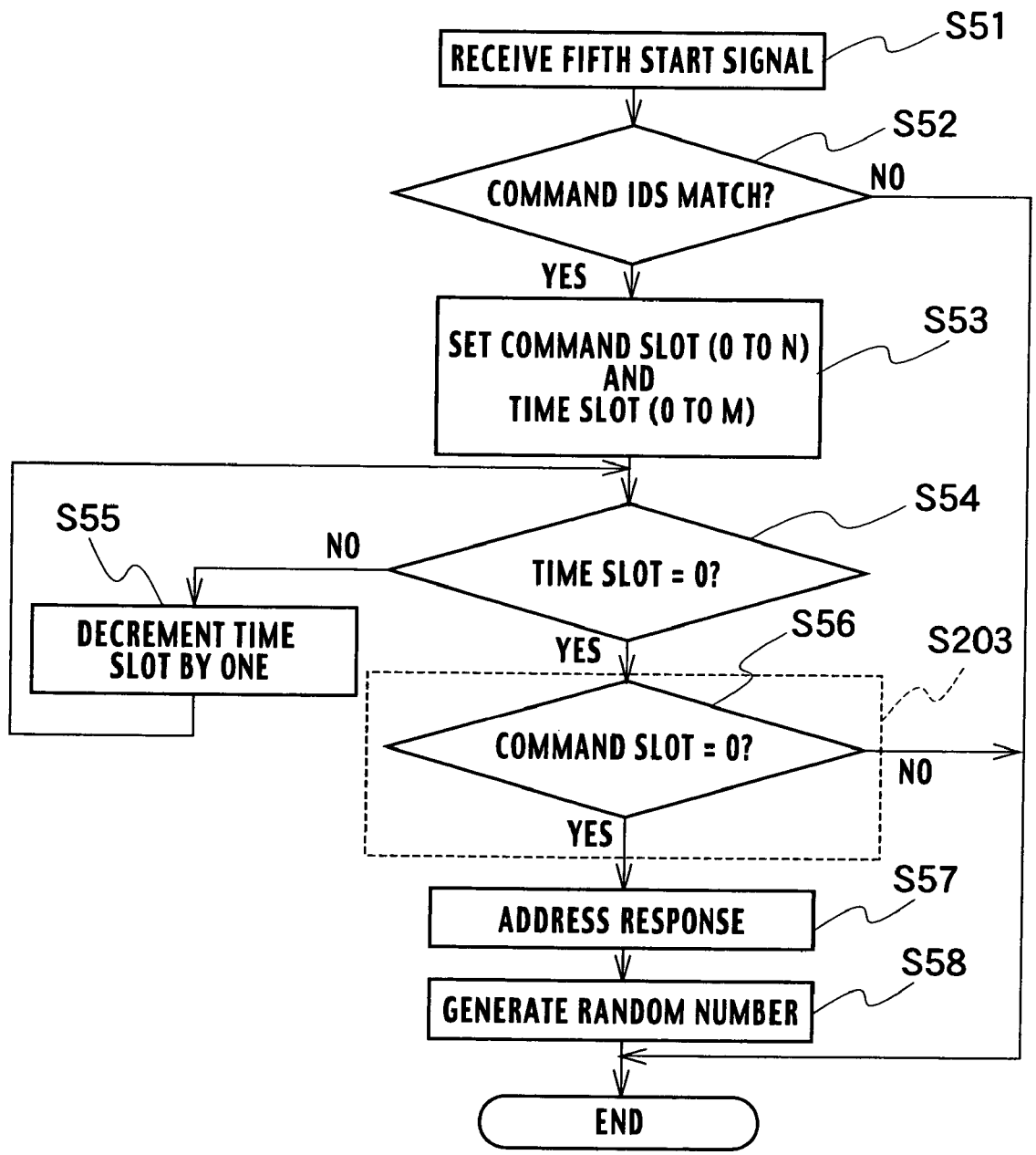
FIG. 17 is a flowchart showing the operation of the wireless card that has received the fifth start signal.

First, with reference to FIG. 17, an explanation will be given for the operation of a wireless card 2 in FIG. 6 when receiving the fifth start signal 56 in FIG. 16A.

(a) At stage S51, the transmitter/receiver 16 in FIG. 6 receives the fifth start signal 56. At stage S52, the command ID comparator 44 in FIG. 6 determines whether the command ID recorded in the command ID register 43 matches the command ID 73 included in the fifth start signal 56. When the two command IDs match (Yes at stage S52), the operation advances to stage S53.

(b) At stage S53, the command slot setup unit 21 in FIG. 6 sets a command slot (0 to N), and the time slot setup unit 22 sets a time slot (0 to M). In other words, the wireless card 2 executes the command slot (0 to N) setup command 67 and the time slot (0 to M) setup command 68. During this process, the command slot setup range (=N) 76 and the time slot setup range (=M) 77 are referred.

(c) At stage S54, the time slot setup unit 22 determines whether the value for the time slot that was set is 0. When the value for the time slot is 0 (Yes at stage S54), the operation advances to stage S56. When the value for the time slot is not 0 (No at stage S54), the operation is shifted to stage S55, and the timer 42 decrements the value for the time slot by one. Thereafter, the operation returns to stage S54 and decrements the value by one until the value for the time slot reaches 0.

(d) At stage S56, the command slot subtractor 23 determines whether the value for the command slot that was set is 0. When the value for the command slot is 0 (Yes at stage S56), the operation advances to stage S57. At stage S57, the wireless card 2 transmits a response signal which includes the card address 46 to the wireless information processing apparatus 1. At stage S58, the first random number generator 38 generates a random number, and the operation of the wireless card 2 is terminated.

Note that, when the two command IDs do not match (No at stage S52) and when the value for the command slot is not 0 (No at stage S56), the operation of the wireless card 2 that received the fifth start signal 56 is terminated.

Figure 18:
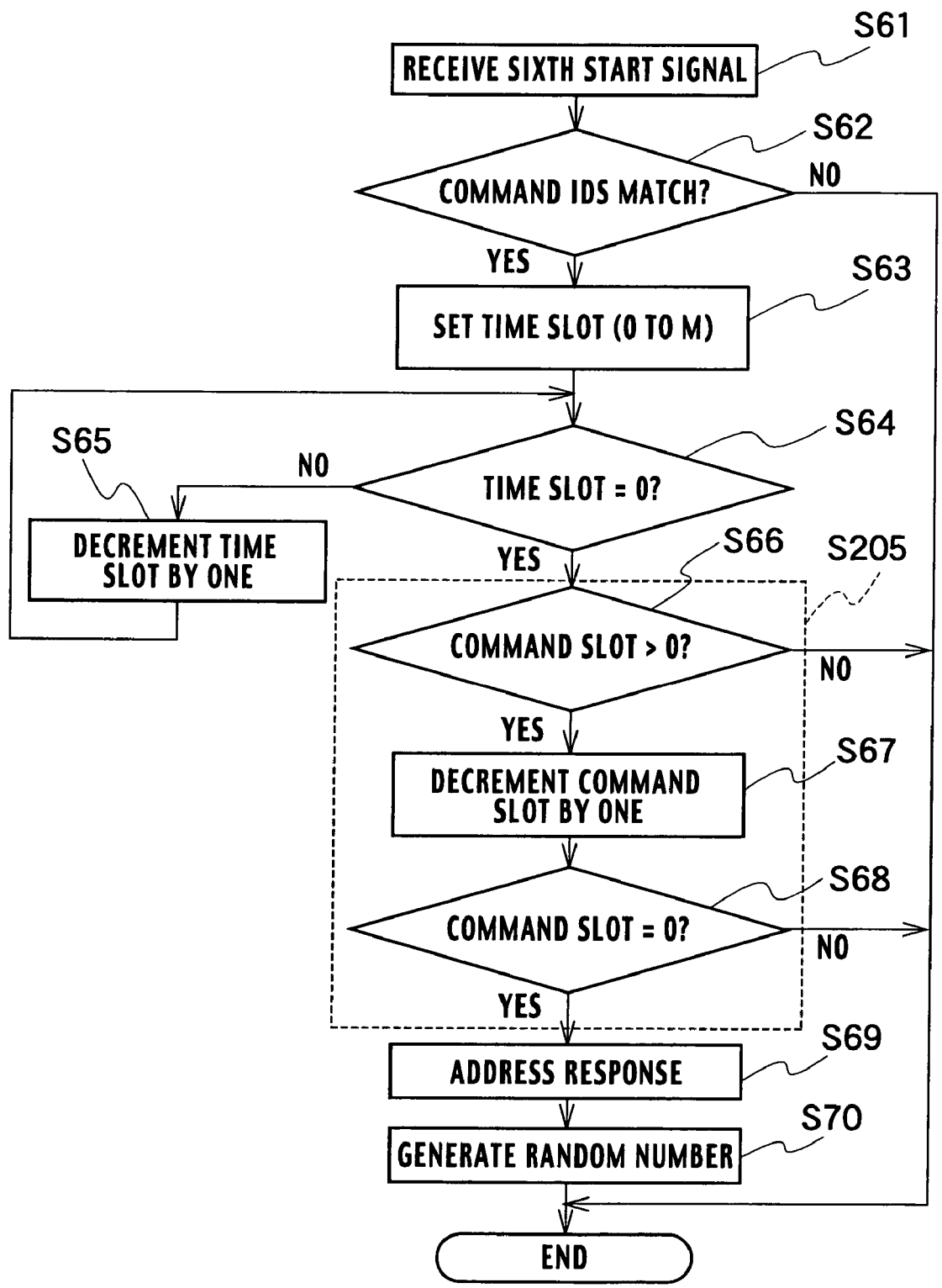
FIG. 18 is a flowchart showing the operation of the wireless card that has received the sixth start signal.

Next, with reference to FIG. 18, an explanation will be given for the operation of a wireless card 2 in FIG. 6 when receiving the sixth start signal 57 in FIG. 16B.

(A) First, at stage S61, the transmitter/receiver 16 in FIG. 6 receives the sixth start signal 57. At stage S62, the command ID comparator 44 in FIG. 6 determines whether the command ID recorded in the command ID register 43 matches the command ID 73 included in the sixth start signal 57. When the two command IDs match (Yes at stage S62), the operation advances to stage S63, and the time slot setup unit 22 sets the time slot (0 to M), i.e., the wireless card 2 executes the time slot (0 to M) setup command 71 in the sixth start signal 57. At this time, the time slot setup range (=M) 77 is referred.

(B) At stage S64, the time slot setup unit 22 determines whether the value for the time slot that was set is 0. When the value of the time slot is 0 (Yes at stage S64), the operation advances to stage S66. When the value of the time slot is not 0 (No at stage S64), the operation is shifted to stage S65, and the timer 42 decrements the value of the time slot by one. Thereafter, the operation returns to stage S54 and decrements the value of the time slot by one until the value reaches 0.

(C) At stage S66, the command slot subtractor 23 determines whether the value for the command slot is greater than 0. When the value for the command slot is greater than 0 (Yes at stage S66), the operation advances to stage S67. At stage S67, the command slot subtractor 23 decrements the value of the command slot by one. At stage S68, the command slot subtractor 23 determines whether the value for the command slot is 0. When the value for the command slot is 0 (Yes at stage S68), the operation advances to stage S69.

(D) At stage S69, the wireless card 2 transmits a response signal to the wireless information processing apparatus 1. Thereafter, at stage S70, the first and second random number generators 38 and 40 generate random numbers, and the operation of the wireless card 2 is terminated.

Note that, when the two command IDs do not match (No at stage S62), when the value for the command slot is 0 at stage S66 (No at stage S66), or when the value for the command slot is not 0 at stage S68 (No at stage S68), the operation of the wireless card 2 that received the sixth start signal 57 is terminated. Thus, the wireless card 2 decrements the value for the command slot each time the sixth start signal 57 is received, and transmits a response signal when the values for both the command slot and the time slot reach 0.

<Communication Method for Wireless Information Processing System>

Figure 19:
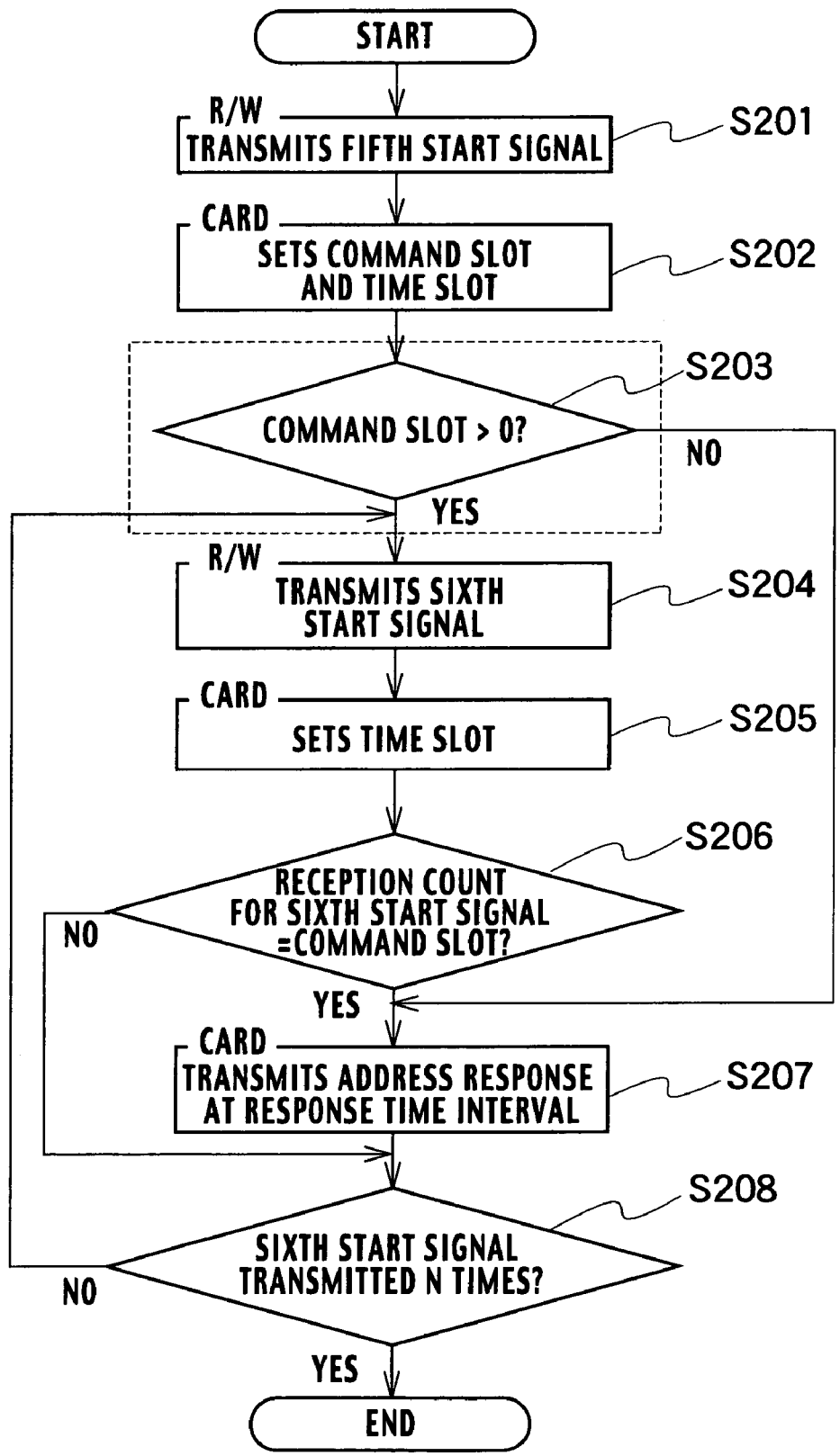
FIG. 19 is a flowchart showing a communication method of the wireless information processing system according to the second embodiment of the present invention.

With reference to FIG. 19, an explanation will be given for a communication method for the wireless information processing system according to the second embodiment of the present invention. In FIG. 19, "R/W" represents the card reader/writer 4, and "card" represents a wireless card 2. Furthermore, the same initial values are provided for the command IDs of the plurality of wireless cards 2 present in the communication area 6 in FIG. 1 while the card addresses 46 differ.

(A) First, at stage S201, the card reader/writer 4 in FIG. 15 transmits the fifth start signal 56 in FIG. 16A to a plurality of the wireless cards 2 in the communication area 6. The command ID 73 and information regarding the command slot setup range (=N) 76 and the time slot setup range (=M) 77 are included in this fifth start signal 56.

(B) Next, at stage S202, the transmitter/receiver 16 in FIG. 6 receives the fifth start signal 56, and the command slot setup unit 21 sets a command slot while the time slot setup unit 22 sets a time slot. Since the same initial values are provided for the command IDs of all the wireless cards 2, all the wireless cards 2 execute the command slot setup command 67 and the time slot setup command 68 included in the fifth start signal 56.

(C) At stage S203, the command slot subtractor 23 determines whether the value of the command slot set at stage S202 is greater than 0. When the value of the command slot is greater than 0 (Yes at stage S203), the operation advances to stage S204. When the value of the command slot is 0 (No at stage S203), the operation is shifted to stage S207. It should be noted that stage S203 corresponds to stage S56 in FIG. 17.

(D) At stage S204, the card reader/writer 4 transmits the sixth start signal 57.

(E) Next, at stage S205, the transmitter/receiver 16 of the wireless card 2 receives the sixth start signal 57 in FIG. 16b, and the time slot setup unit 22 sets a time slot in accordance with the time slot setup command 71 included in the sixth start signal 57.

(F) At stage S206, the command slot subtractor 23 determines whether the number of times that the sixth start signal 57 has been received matches the value of the command slot. It should be noted that stage S206 corresponds to stages S66 to S68 in FIG. 18. When the number of times that the sixth start signal 57 has been received matches the value of the command slot (Yes at stage S206), the operation advances to stage S207. When these two values do not match (No at stage S206), the operation is shifted to stage S208.

(G) At stage S207, the transmitter/receiver 16 of the wireless card 2 transmits a response signal which includes the card address 46 at a response time interval that is defined by the time slot set at stage S202 or S205. In other words, when the decision at stage S203 is "No" at stage S203, the wireless card 2 executes the address response command 66 included in the fifth start signal 56. When the decision at stage S206 is "Yes", the wireless card 2 executes the address response command 69 included in the sixth start signal 57.

(H) Finally, at stage S208, the host computer 5 determines whether the sixth start signal 57 was transmitted for N times. When the sixth start signal 57 has not yet been transmitted for N times (No at stage S208), the operation returns to stage S204, and the loop at stages S204 to S208 is repeated for N times. When the sixth start signal 57 has been transmitted for N times (Yes at stage S208), the operation is terminated.

Note that the communication method constituted of stages S201 to S208 is called a "mixed communication method", in which the command response method and the time response method coexist.

Figure 20:
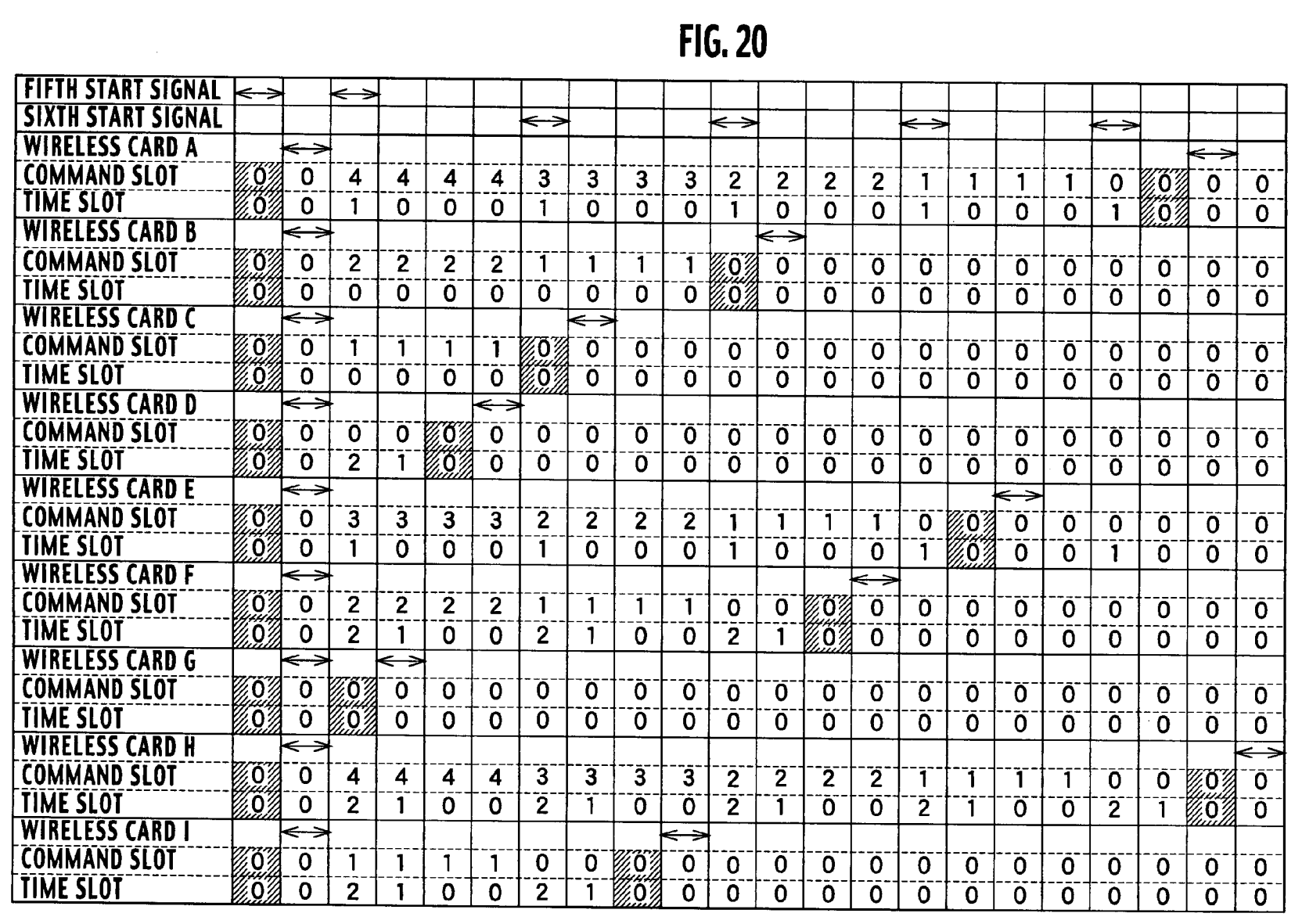

Next, with reference to FIG. 20, an explanation will be given for a case where the mixed communication method in FIG. 19 is employed for nine wireless cards 2. In FIG. 20, "A to I" denote the symbols provided for the wireless cards 2, and the "arrows" for the fifth and the sixth start signals represent the transmission by the card reader/writer 4 of the fifth and the sixth start signals 56 and 57. Moreover, the shaded portions (arrows) provided for the wireless cards A to I represent the transmissions of response signals. Furthermore, the command slot setup range 76 included in the fifth and sixth start signals 56 and 57 is N=4, and the time slot setup range 77 is M=2.

(a) First, the fifth start signal 56 is transmitted by the card reader/writer 4 for the first time. It should be noted that the fifth start signal 56 transmitted for the first time includes information regarding the command slot setup range (N=0) 76 and the time slot setup range (M=0) 77. Upon receiving the fifth start signal 56 for the first time, the wireless cards A to I set the command slots=0 and the time slots=0, respectively. Therefore, as shown in FIG. 20, all the wireless cards A to I simultaneously transmit response signals, and the first and second random number generators 38 and 40 generate random numbers. In this manner, the command slots and the time slots can be initialized (N=0 and M=0), and the random numbers for setting the command slots and the time slots can be prepared.

(b) Next, the fifth start signal 56 is transmitted by the card reader/writer 2 for the second time. It should be noted that the fifth start signal 56 transmitted for the second time includes information regarding the command slot setup range (N=4) 76 and the time slot setup range (M=2) 77. Upon the second reception of the fifth start signal 56, the wireless cards A to I set the command slots within a range from 0 to 4 and the time slots within a range from 0 to 2.

(c) As shown in FIG. 20, the wireless cards D and G, which have set command slot values to 0, transmit response signals at response time intervals defined by the time slot since the number of times that the sixth start signal 57 has been received (=0) matches the value of the command slot. In this case, since the wireless card D has set its time slot=2 and the wireless card G has set its time slot value=0, the wireless cards D and G transmit response signals at different response time intervals. Therefore, the simultaneous transmission of response signals by the wireless cards D and G can be avoided, and the card reader/writer 4 can appropriately receive these response signals from the wireless cards D and G. Thus, after the transmission of the response signals, the command IDs of the wireless cards D and G are changed. Note that, since the wireless cards A to C, E, F, H and I have set their command slots to natural numbers other than 0, these wireless cards do not transmit response signals even at response time intervals defined by the time slots.

(d) Next, the sixth start signal is transmitted by the card reader/writer 4 for the first time. It should be noted that the sixth start signal 57 transmitted for the first time includes information on the time slot setup range (M=2) 77.

(e) Among the wireless cards that have received the sixth start signal 57 for the first time, the wireless cards A to C, E, F, H and I, which have not yet transmitted response signals, respectively set time slots in a range from 0 to 2 (=M) and decrement the values of the command slots by one. Since the command IDs have already been changed, the wireless cards D and G for which response signals have been appropriately received do not execute the time slot (0 to 2) setup command 71 or the command slot subtraction command 70 included in the sixth start signal 57.

(f) The wireless cards C and I have the command slots set to 1 upon the second reception of the fifth start signal 56. Accordingly, since the number of times (=1) of the reception of the sixth start signal 57 matches the value of the command slot, the wireless cards C and I transmit response signals at the response time intervals defined by the time slots. In this case, since the wireless card C sets the time slot=0 and the wireless card I sets the time slot=2, the wireless cards C and I transmit response signals at different response time intervals. Therefore, the simultaneous transmission of response signals by the wireless cards C and I can be avoided, and the response signals from the wireless cards C and I can be appropriately received by the card reader/writer 4. Thus, after the transmission of the response signals, the command IDs of the wireless cards C and I are changed.

(g) In the same manner, the sixth start signal 57 is transmitted for the second, third and fourth time by the card reader/writer 4. Thereafter, at response time intervals defined by the time slots, response signals are transmitted by the wireless cards B and F for the second reception of the sixth start signal 57, by the wireless card E after the third reception of the sixth start signal 57, and by the wireless cards A and H after the fourth reception of the sixth start signal 57.

In the processing shown in FIG. 20, each time the sixth start signal 57 is received, the values for the command slots of the wireless cards A to I are decremented by one. In this case, a case where the value for the command slot reaches 0 is regarded as a case where the number of times that the sixth start signal 57 has been received matches the value for the command slot.

As described above, according to the second embodiment of the present invention, when the number of times that the sixth start signal 57 has been received matches the value for a command slot, a wireless card 2 transmits a response signal at a response time interval defined by the time slot. Even when two or more wireless cards 2 have set the same value for the command slots, as long as different values have been set for the time slots, a time difference can be obtained for the response timings, and response signal conflicts can be avoided. In other words, when the "mixed communication method" is employed, only a wireless card 2 in which the two response conditions designated for the command slot and the time slot have been established can transmit a response signal. Therefore, the probability of response signal conflicts occuring will be lessened, and communication time will be reduced.

(Modification of Second Embodiment)

According to the "mixed communication method" shown in FIG. 19, various other communication methods can be provided by controlling the command slot setup range (=N) and the command slot setup range (=M) included in the fifth and the sixth start signals 56 and 57.

Figure 21A:
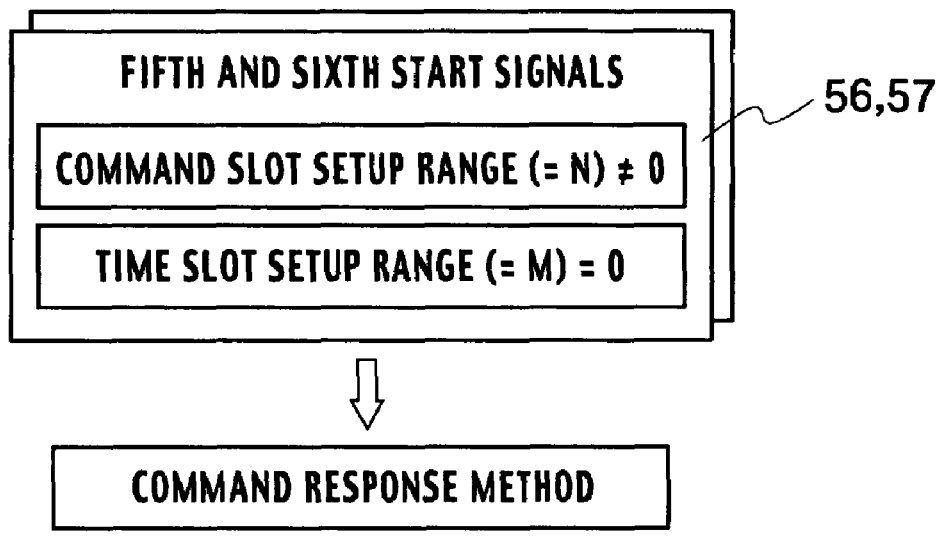
FIGS. 21A and 21B are block diagrams for explaining a modification of the wireless information processing system according to the second embodiment.

For example, assume that, as is shown in FIG. 21A, the command slot setup range (=N) is other than 0 and the time slot setup range (=M) is 0 for the fifth and the sixth start signals 56 and 57. When the mixed communication method in FIG. 19 is employed by using the fifth and the sixth start signals 56 and 57 in FIG. 21A, at stages S202 and S205, the wireless card 2 sets a command slot for which the value ranges from 1 to N, and a time slot value of 0. Since the time slot for the wireless card 2 is set to 0, at stage S207, regardless of the response time interval, the wireless card 2 transmits a response signal. That is, substantially the same communication method as the "command response method" in FIG. 13 can be employed.

Figure 21B:
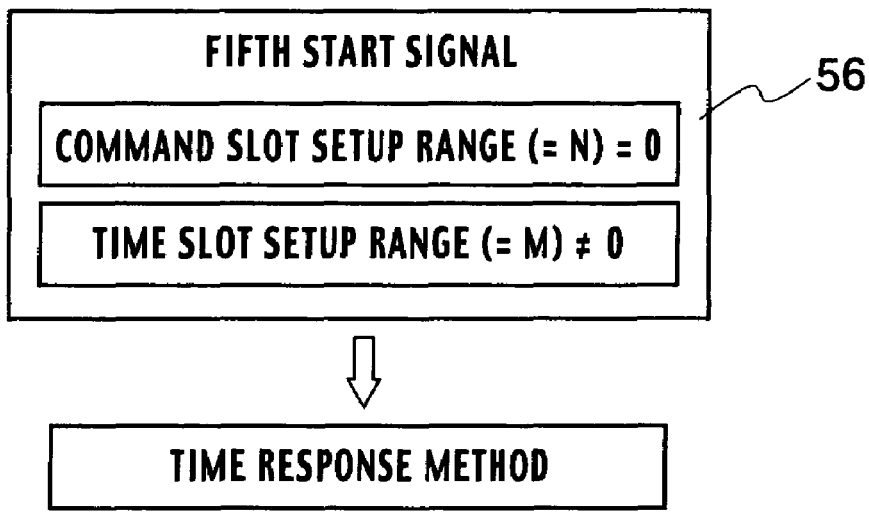

Further, assume that, as is shown in FIG. 21B, the command slot setup range (=N) is 0 and the time slot setup range (=M) is other than 0 for the fifth start signal 56. When the mixed communication method in FIG. 19 is provided by using the fifth start signal 56 in FIG. 21B, at the stage S202 the wireless card 2 sets a command slot value of 0 and a time slot value ranging from 1 to M. Then, at stage S203, all the wireless cards 2 select the decision of "No", and the operation advances to stage S207. That is, substantially the same communication method as the "time response method" in FIG. 13 can be employed.

As described above, when the command slot setup range (=N) and the command slot setup range (=M) are adjusted for the fifth and the sixth start signals 56 and 57, switching among the command response method, the time response method, the shift communication method and the mixed communication method can be freely performed.

As described above, according to the first and the second embodiment of the present invention and the modification of the second embodiment, it is possible to provide the wireless information processing system, the wireless information recording medium, the wireless information processing apparatus, and the communication method employed for the wireless information processing system that can avoid response signal conflicts and reduce the period of time required for communication, regardless of the number of wireless cards 2 serving as communication objects.

(Other Embodiments)

As mentioned above, the present invention has been described through the first and second embodiments and modification thereof, however, the descriptions and drawings that constitute a portion of this disclosure should not be perceived as those limiting the present invention. Various alternative embodiments and operational techniques will become clear to persons skilled in the art from this disclosure.

Figure 22:
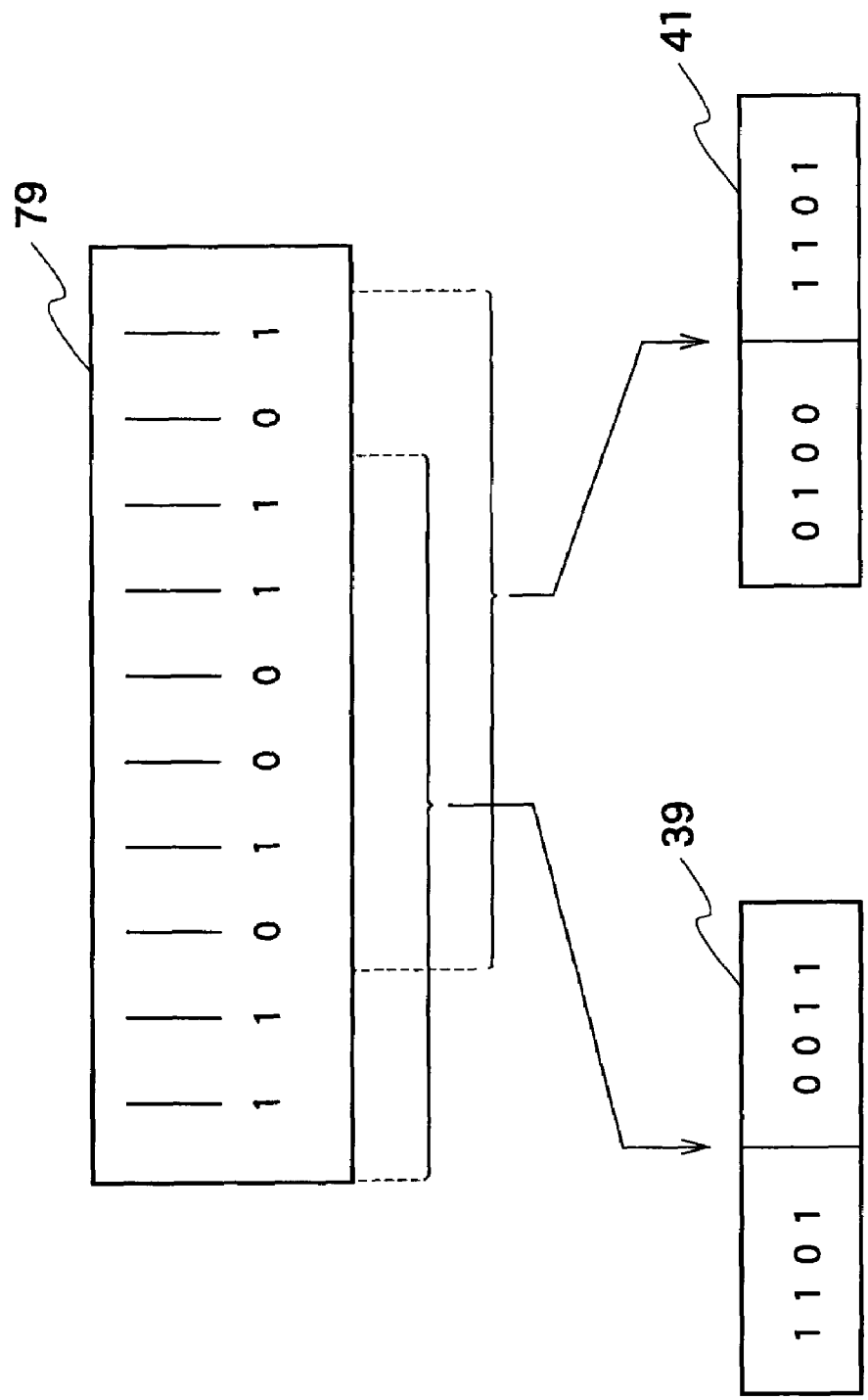
FIG. 22 is a block diagram showing the structure of a wireless card that sets a command slot and a time slot from a single random number generator.

For the first and the second embodiments of the present invention and the modification of the second embodiment, each wireless card 2 has employed the two random number generators 38 and 40. The present invention is not limited to this arrangement, however, and one or three or more random number generators may be employed. For example, instead of the first and the second random number generators 38 and 40 in FIG. 7, the command counter 39 and the time counter 41 in FIG. 6 may share a random number generator 79 shown in FIG. 22. In this case, while the first and the second random number generators 38 and 40 generate the eight-bit data random number 47, the random number generator 79 generates a ten-bit data random number. Then, the command counter 39 sets the command slot by using the upper eight digits of the ten data bits, and the time counter 41 sets the time slot by using the lower eight digits of the ten data bits. In this manner, the area required for the formation of a circuit constituting the random number generator can be reduced.

According to the first and the second embodiments of the present invention and the modification of the second embodiment, the command IDs have been employed to identify a plurality of wireless cards 2. However, the present invention is not limited to this method. For example, when a "protocol method" is employed, a response by a wireless card 2 to the various commands 58 in FIG. 4, can be forcibly inhibited irrespective of the command ID. The protocol method will now be specifically explained.

To obtain the card address 46, the card reader/writer 4 employs various communication methods, such as the command response method, the time response method, the shift communication method and the mixed communication method. Then, based on the obtained card address 46, the card reader/writer 4 transmits to a specific wireless card 2 a command (an ATQ cancel command) that nonresponds to the various commands 58, and this command is received by all the wireless cards 2 located in the communication area for the card reader/writer 4. However, only a wireless card 2 having a card address that matches the card address 46 transmits nonresponds to the various commands 58 included in the start signal 51 received hereafter. When the command ID is employed, so long as the command ID, even after being changed, matches the post-changed command ID 78 in FIG. 5D, the various commands 58 can be executed. However, when the protocol is employed, the wireless card 2 does not execute any command unless the wireless card 2 is reset.

Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless information processing system comprising:
    a wireless information processing apparatus comprising:
        a first start signal generator configured to generate a first start signal capable to request a wireless information recording medium having unique identification information to set a command slot;
        a second start signal generator configured to generate a second start signal capable to request the wireless information recording medium to transmit the identification information;

a third start signal generator configured to generate a third start signal capable to request the wireless information recording medium to set a time slot;

a transmitter capable to transmit the first to third start signals to a plurality of wireless information recording media located in a communication area; and a receiver capable to receive a response signal including the identification information transmitted by the wireless information recording medium, and the wireless information recording medium comprising:

an identification information recorder in which the identification information is recorded;

a receiver configured to receive the first to third start signals;

a command slot setup unit configured to set the command slot;

an accumulation unit configured to accumulate a number of times that the second start signal has been received;

a transmitter configured to transmit the response signal at a response time interval defined by the time slot when the number of times that the second start signal is received matches a value of the command slot or when a value of the time slot is set; and a time slot setup unit capable to set the time slot when the response signal has not been appropriately received by the wireless information processing apparatus.

2. A wireless information processing system comprising:

a wireless information processing apparatus comprising:

a first start signal generator configured to generate a first start signal capable to request a wireless information recording medium having unique identification information to set a command slot;

a second start signal generator configured to generate a second start signal capable to request the wireless information recording medium to transmit the identification information;

a third start signal generator configured to generate a third start signal capable to request the wireless information recording medium to set a time slot;

a transmitter capable to transmit the first to third start signals to a plurality of wireless information recording media located in a communication area; and a receiver capable to receive a response signal including the identification information transmitted by the wireless information recording medium, and the wireless information recording medium comprising:

an identification information recorder in which the identification information is recorded;

a receiver configured to receive the first to third start signals;

a command slot setup unit configured to set the command slot;

an accumulation unit configured to accumulate a number of times that the second start signal has been received;

a time slot setup unit configured to set the time slot; and a transmitter capable to transmit the response signal to the wireless information processing apparatus at a response time interval defined by the time slot when the number of times that the second start signal is received matches a value of the command slot.

3. A wireless information recording medium comprising:

an identification information recorder in which unique identification information is recorded;

a receiver capable to receive a first start signal requesting a setup of a command slot, a second start signal requesting a transmission of the identification information, and a third start signal requesting a setup of a time slot, the first to third signals being transmitted by a wireless information processing apparatus;

a command slot setup unit configured to set the command slot;

an accumulation unit configured to accumulate a number of times that the second start signal has been received;

a transmitter capable to transmit a response signal including the identification information to the wireless information processing apparatus at a response time interval defined by the time slot when the number of times that the second start signal is received matches a value of the command slot or when the time slot is set; and a time slot setup unit capable to set the time slot when the response signal has not been appropriately received by the wireless information processing apparatus.

4. The wireless information recording medium of claim 3, wherein the value of the command slot is any one of integers from 0 to N (N is 0 or an arbitrary natural number), a value of the time slot is any one of integers from 0 to M (M is 0 or an arbitrary natural number), information on the integer N is added to the first start signal, and information on the integer M is added to the third start signal.

5. The wireless information recording medium of claim 4, wherein the accumulation unit is a command slot subtractor configured to decrement the value of the command slot by one each time the second start signal is received and determines whether the value of the command slot has reached 0.

6. The wireless information recording medium of claim 3, wherein the command slot setup unit comprises:

a first random number generator configured to generate a random number; and a command counter configured to employ the random number to set the command slot, and wherein the time slot setup unit comprises:

a second random number generator configured to generate a random number; and a time counter configured to employ the random number to set the time slot.

7. The wireless information recording medium of claim 3 wherein the command slot setup unit comprises:

a random number generator configured to generate a random number, and a command counter configured to employ a part of the random number to set the command slot, and wherein the time slot setup unit comprises a time counter configured to employ another part of the random number to set the time slot.

8. The wireless information recording medium of claim 3, further comprising a specific information controller comprising:

a specific information recorder capable to record specific information being effective during a communication period with the wireless information processing apparatus; and a specific information comparator configured to compare the specific information with specific information included in the first to third start signals, wherein, when the specific information recorded in the specific information recorder matches the specific information included in the first to third start signals, the command slot setup unit, the accumulation unit and the time slot setup unit execute each request included in the first to third start signals.

9. The wireless information recording medium of claim 8, wherein the receiver further receives a fourth start signal requesting a change in the specific information recorded in the specific information recorder, and wherein the specific information controller further comprises a specific information change unit configured to change the specific information recorded in the specific information recorder when the specific information in the specific information recorder matches specific information included in the fourth start signal, and the identification information matches pre-change identification information included in the fourth start signal.

10. A wireless information recording medium comprising:
an identification information recorder in which unique identification information is recorded;
a receiver capable to receive a first start signal requesting a setup of a command slot, a second start signal requesting a transmission of the identification information, and a third start signal requesting a setup of a time slot, the first to third signals being transmitted by a wireless information processing apparatus;
a command slot setup unit configured to set the command slot;
an accumulation unit configured to accumulate a number of times that the second start signal has been received;
a time slot setup unit configured to set the time slot; and
a transmitter capable to transmit a response signal including the identification information to the wireless information processing apparatus at a response time interval defined by the time slot when the number of times that the second start signal is received matches a value of the command slot.

11. A wireless information processing apparatus comprising:
a first start signal generator configured to generate a first start signal capable to request a wireless information recording medium having unique identification information to set a command slot;
a second start signal generator configured to generate a second start signal capable to request the wireless information recording medium to transmit the identification information;
a third start signal generator configured to generate a third start signal capable to request the wireless information recording medium to set a time slot;
a transmitter capable to transmit the first to third start signals to a plurality of wireless information recording media located in a communication area; and
a receiver capable to receive a response signal including the identification information transmitted by the wireless information recording medium, in which a number of times that the second start signal has been received matches a value of the command slot, and capable to receive the response signal transmitted by the wireless information recording medium at a response time interval defined by the time slot.

12. The wireless information processing apparatus of claim 11, wherein the value of the command slot is any one of integers from 0 to N (N is 0 or an arbitrary natural number), a value of the time slot is any one of integers from 0 to M (M is 0 or an arbitrary natural number), information on the integer N is added to the first start signal, and information on the integer M is added to the third start signal.

13. The wireless information processing apparatus of claim 11, wherein the first to third start signals include specific information being effective during a communication period with the wireless information recording medium.

14. The wireless information processing apparatus of claim 13 further comprising a fourth start signal generator configured to generate a fourth start signal capable to request the wireless information recording medium to change the specific information included in the wireless information recording medium.

15. A communication method for a wireless information processing system comprising:
a wireless information processing apparatus instructing a plurality of wireless information recording media present in a communication area to set command slots of which values are any one of integers from 0 to N (N is 0 or an arbitrary natural number);
a wireless information recording medium, in which the value of the command slot matches a number of times that a response instruction has been received from the wireless information processing apparatus, transmitting unique identification information included in the wireless information recording media;
the wireless information processing apparatus instructing the plurality of wireless information recording media to set time slots of which values are any one of integers from 0 to M (M is 0 or an arbitrary natural number); and
the wireless information recording medium, of which the identification information transmitted has not been appropriately received by the wireless information processing apparatus, transmitting the identification information at a response time interval defined by the time slot.

16. A communication method for a wireless information processing system comprising:
a wireless information processing apparatus transmitting a first start signal requesting a setup of command slots to a plurality of wireless information recording media present in a communication area;
a wireless information recording medium, which has received the first start signal, setting the command slot;
the wireless information processing apparatus transmitting a second start signal requesting the wireless information recording medium to transmit unique identification information included in the wireless information recording medium;
the wireless information recording medium, in which a number of times that the second start signal has been received matches a value of the command slot, transmitting a response signal including the identification information;
the wireless information processing apparatus transmitting a third start signal requesting a setup of a time slot;
the wireless information recording medium, for which the response signal has not been appropriately received by the wireless information processing apparatus, setting the time slot; and
the wireless information recording medium transmitting the response signal at a response time interval defined by the time slot.

17. The communication method of claim 16, wherein the value of the command slot is any one of integers from 0 to N (N is 0 or an arbitrary natural number), a value of the time slot is any one of integers from 0 to M (M is 0 or an arbitrary natural number), information on the integer N is added to the first start signal, and information on the integer M is added to the third start signal.

18. The communication method of claim 17, wherein the transmission of the response signal including the identification information from the wireless information recording medium in which the number of times that the second start signal matches the value of the command slot, comprising:
   decrementing the value of the command slot each time the second start signal is received; and
   transmitting the response signals when the value of the command slots reaches 0.

19. The communication method of claim 16, wherein the wireless information recording media, for which the response signals have not been appropriately received by the wireless information processing apparatus, are two or more wireless information recording media having set a same value for the command slots and simultaneously transmitted the response signals.

20. The communication method of claim 16, wherein the command slots and the time slots are set by using random numbers, respectively.

21. A communication method for a wireless information processing system comprising:
   a wireless information processing apparatus instructing a plurality of wireless information recording media present in a communication area to set command slots to any one of integers from 0 to N (N is 0 or an arbitrary natural number), and set time slots to any one of integers from 0 to M (M is 0 or an arbitrary natural number);
   a wireless information recording medium, in which a value of the command slot matches a number of times that a response instruction transmitted by the wireless information processing apparatus has been received, transmitting unique identification information included in the wireless information recording medium at a response time interval defined by the time slots.

22. The communication method of claim 21, further comprising:
   the wireless information processing apparatus transmitting, to the plurality of wireless information recording media present in the communication area, a first start signal requesting a setup of command slots and a third start signal requesting a setup of time slots;
   the wireless information recording medium which has received the first and third start signals setting the command slot and the time slot;
   the wireless information processing apparatus transmitting the third start signal and a second start signal requesting a transmission of unique identification information included in the wireless information recording medium; and
   the wireless information recording medium, in which the number of times that the second start signal has been received matches the value of the command slot, transmitting a response signal including the identification information at a response time interval defined by the time slot.

23. The communication method of claim 22, wherein the value of the command slot is any one of integers from 0 to N (N is 0 or an arbitrary natural number), a value of the time slot is any one of integers from 0 to M (M is 0 or an arbitrary natural number), information on the integer N is added to the first start signal, and information on the integer M is added to the third start signal.

24. The communication method of claim 23, wherein the transmission of the response signal including the identification information by the wireless information recording medium in which the number of times that the second start signal has been received matches the value of the command slot, at the response interval defined by the time slot, comprising:
   decrementing the value of the command slot each time the second start signal is received; and
   transmitting the response signal at the response time interval when the value of the command slot reaches 0.

* * * * *